United States Patent
Kim et al.

(10) Patent No.: US 11,877,275 B2
(45) Date of Patent: Jan. 16, 2024

(54) METHOD FOR ADAPTIVELY SETTING REFERENCE SIGNAL PATTERN IN WIRELESS COMMUNICATION SYSTEM, AND APPARATUS THEREFOR

(71) Applicant: LG ELECTRONICS INC., Seoul (KR)

(72) Inventors: Kyuseok Kim, Seoul (KR); Jiwon Kang, Seoul (KR); Kijun Kim, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 289 days.

(21) Appl. No.: 16/973,401

(22) PCT Filed: Jun. 10, 2019

(86) PCT No.: PCT/KR2019/006964
§ 371 (c)(1),
(2) Date: Dec. 8, 2020

(87) PCT Pub. No.: WO2019/235906
PCT Pub. Date: Dec. 12, 2019

(65) Prior Publication Data
US 2021/0258940 A1     Aug. 19, 2021

(30) Foreign Application Priority Data

Jun. 8, 2018   (KR) .................. 10-2018-0065786

(51) Int. Cl.
*H04W 72/044* (2023.01)
*H04L 27/26* (2006.01)
*H04W 72/23* (2023.01)

(52) U.S. Cl.
CPC ......... *H04W 72/046* (2013.01); *H04L 27/261* (2013.01); *H04W 72/23* (2023.01)

(58) Field of Classification Search
None
See application file for complete search history.

(56) References Cited

U.S. PATENT DOCUMENTS

2013/0155897 A1* 6/2013 Ihm .................. H04B 7/024
                                                    370/252
2014/0036800 A1* 2/2014 Frenne ............... H04L 5/0091
                                                    370/329

(Continued)

FOREIGN PATENT DOCUMENTS

KR  20180057467    5/2018
WO  2010117240    10/2010

OTHER PUBLICATIONS

Catt, "Remaining issues on DMRS," 3GPP TSG-RAN WG1 #92, R1-1801724, Mar. 2018, 21 pages.

(Continued)

*Primary Examiner* — Alpus Hsu
*Assistant Examiner* — Camquyen Thai
(74) *Attorney, Agent, or Firm* — LEE, HONG, DEGERMAN, KANG & WAIMEY

(57) ABSTRACT

The present disclosure provides a method for a user equipment (UE) to receive a reference signal from a base station in a wireless communication system. More specifically, the method includes receiving, from the base station, configuration information, wherein the configuration information includes first mapping information related to a mapping relationship between a plurality of mapping patterns, to which dedicated demodulation reference signals are mapped on a resource, and a plurality of transmission beams through which the dedicated demodulation reference signals are transmitted; receiving, from the base station, a first demodulation reference signal related to a demodulation of downlink data; and receiving, from the base station, the downlink (Continued)

data via a channel estimated based on the first demodulation reference signal.

17 Claims, 22 Drawing Sheets

(56) References Cited

U.S. PATENT DOCUMENTS

| | | | | |
|---|---|---|---|---|
| 2014/0226541 A1* | 8/2014 | Xu | ............... | H04W 72/0446 |
| | | | | 370/336 |
| 2015/0282123 A1* | 10/2015 | Miao | ............... | H04W 48/00 |
| | | | | 455/450 |
| 2016/0128038 A1 | 5/2016 | Awad et al. | | |
| 2016/0183134 A1* | 6/2016 | Auer | ............... | H04W 36/08 |
| | | | | 455/436 |
| 2016/0192341 A1* | 6/2016 | Park | ............... | H04B 7/0408 |
| | | | | 455/501 |
| 2018/0062711 A1* | 3/2018 | Mizusawa | ............... | H04W 72/042 |
| 2018/0083680 A1* | 3/2018 | Guo | ............... | H04B 7/0626 |
| 2018/0176896 A1* | 6/2018 | Petersson | ............... | H04W 72/085 |
| 2018/0220458 A1* | 8/2018 | Ouchi | ............... | H04W 16/14 |
| 2018/0279284 A1* | 9/2018 | Wang | ............... | H04W 72/0406 |
| 2018/0343653 A1* | 11/2018 | Guo | ............... | H04W 72/1273 |
| 2019/0052443 A1* | 2/2019 | Cheng | ............... | H04L 27/2613 |
| 2019/0229792 A1* | 7/2019 | John Wilson | ............... | H04W 72/042 |
| 2019/0320333 A1* | 10/2019 | Koskela | ............... | H04W 36/305 |
| 2019/0334599 A1* | 10/2019 | Davydov | ............... | H04L 5/0051 |

OTHER PUBLICATIONS

Intel Corporation, "NR PDSCH UE demodulation requirements," 3GPP TSG-RAN WG4 #87, R1-1806284, May 2018, 7 pages.
PCT International Application No. PCT/KR2019/006964, International Search Report dated Oct. 11, 2019, 4 pages.

* cited by examiner

[FIG. 1]
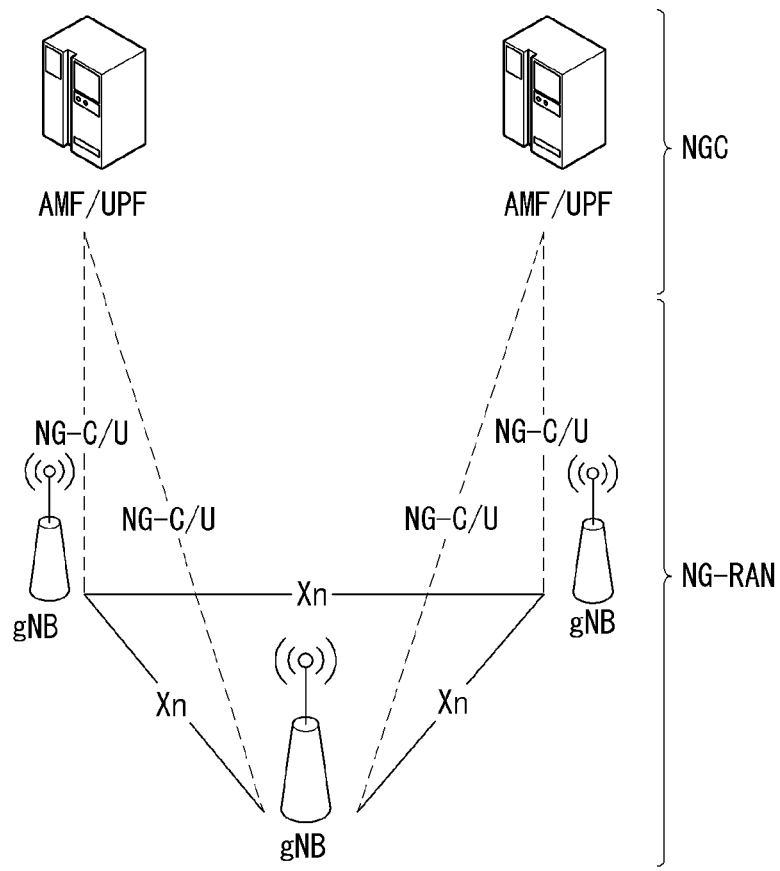
[FIG. 2]
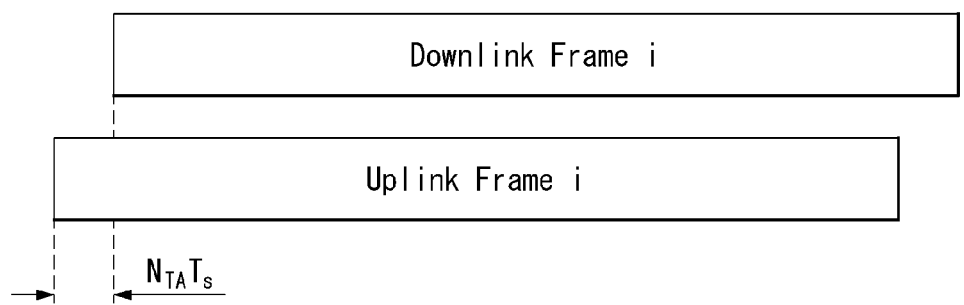

[FIG. 3]
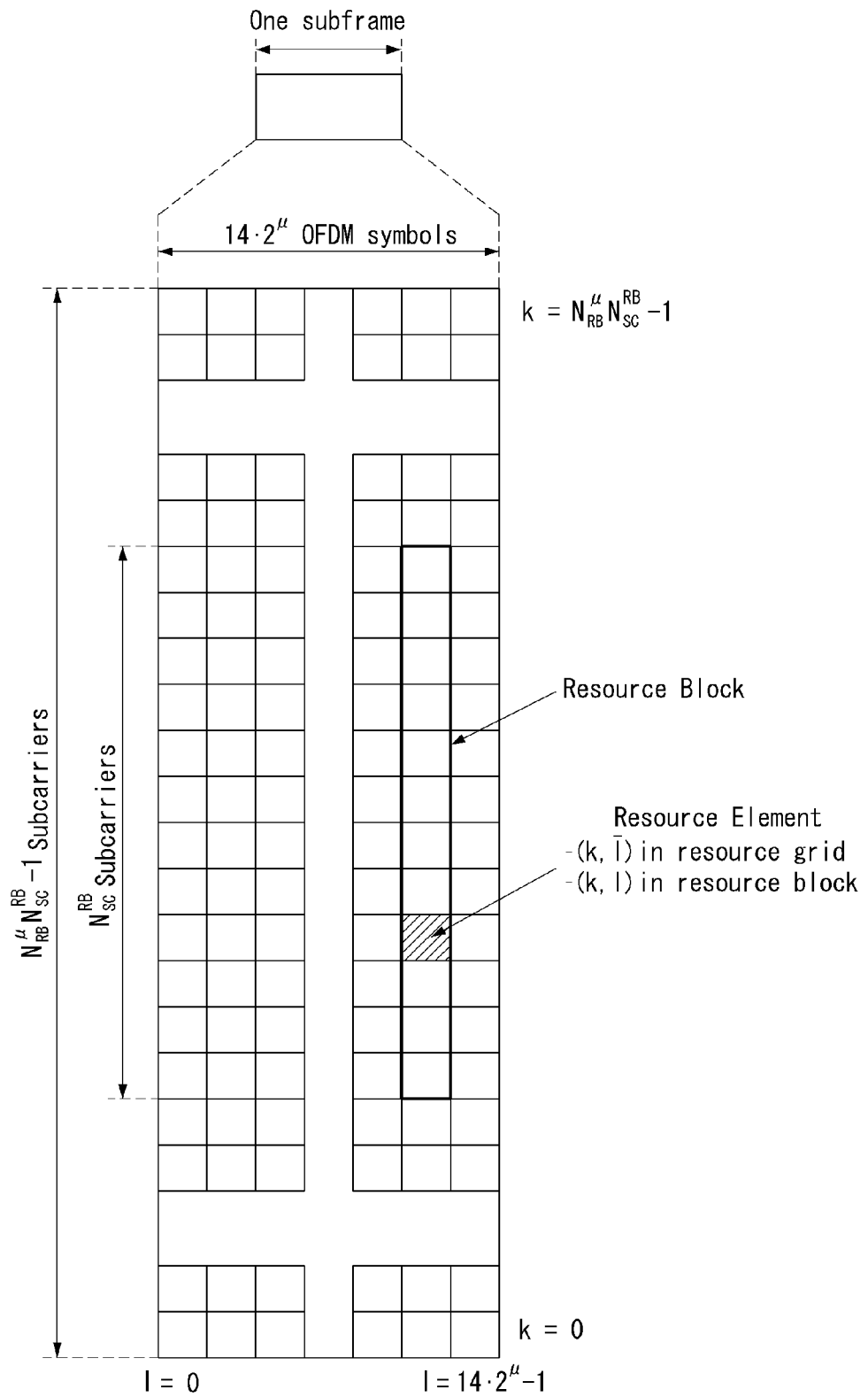

[FIG. 4]
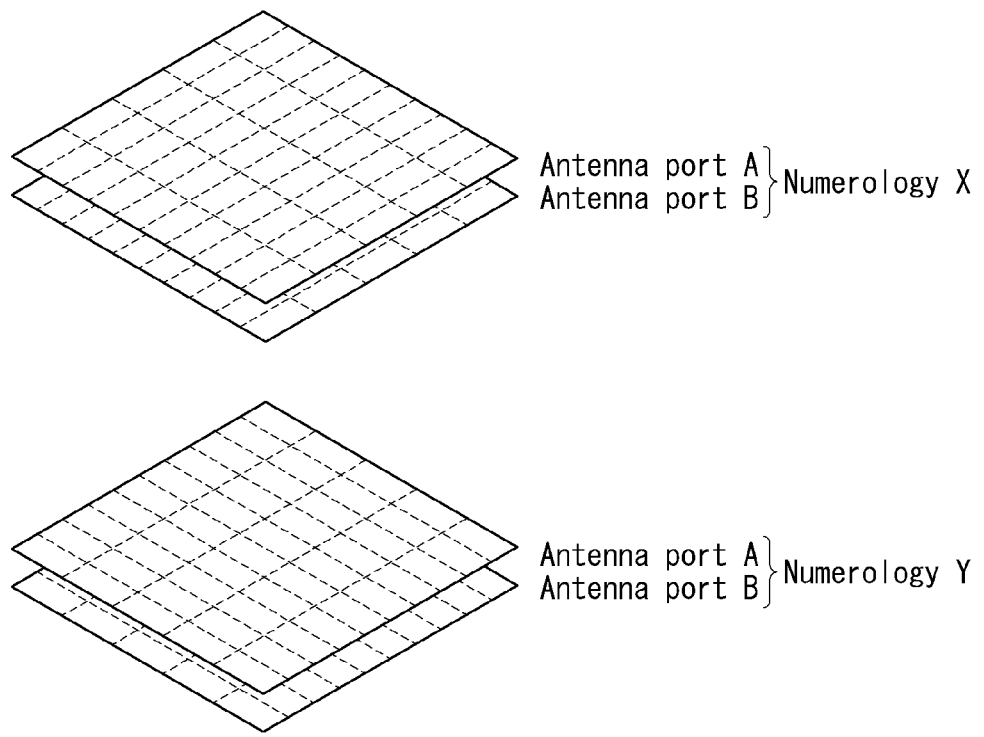

[FIG. 5]
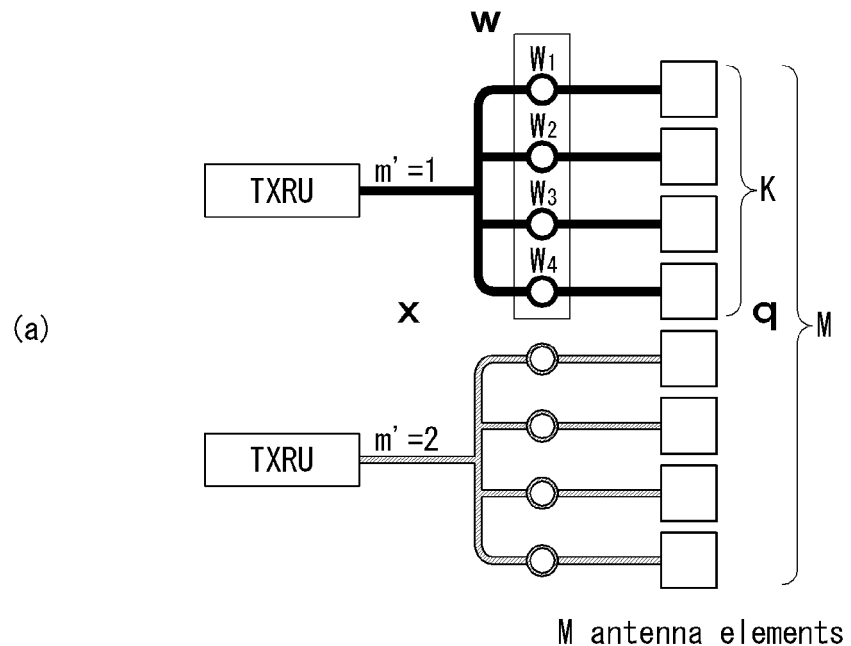
(a)
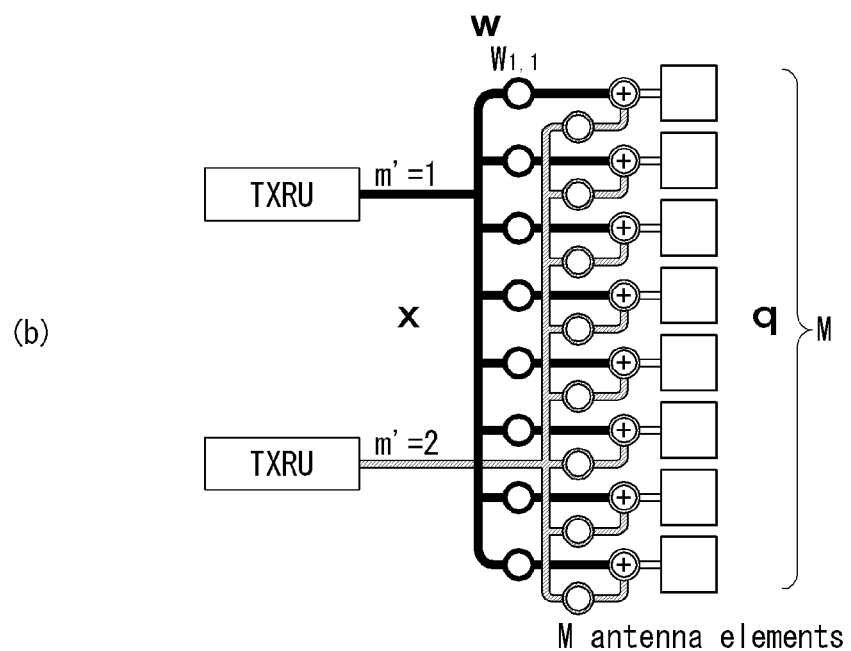
(b)

[FIG. 6]
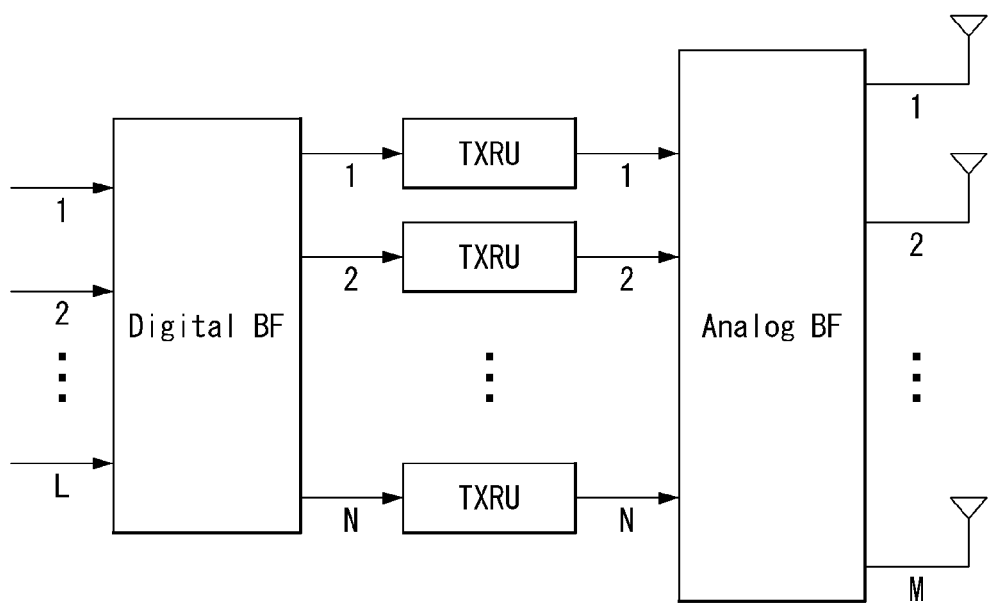

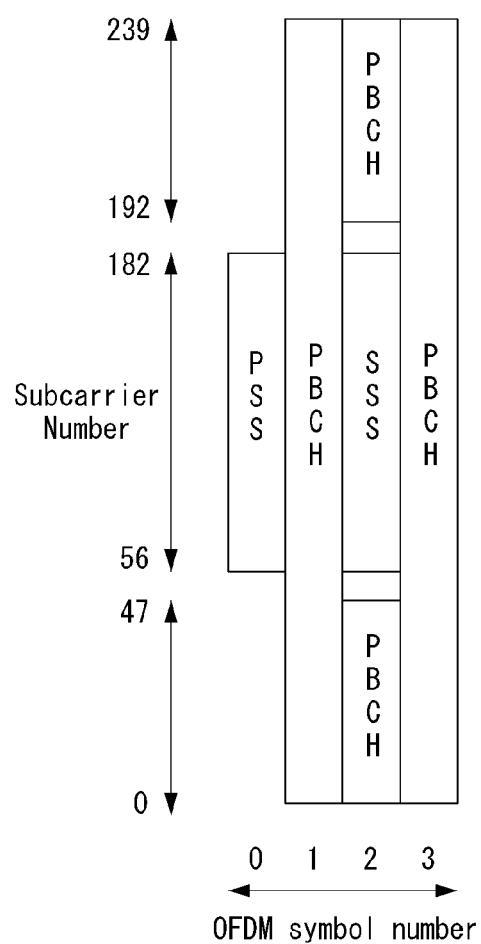
[FIG. 7]

[FIG. 8]
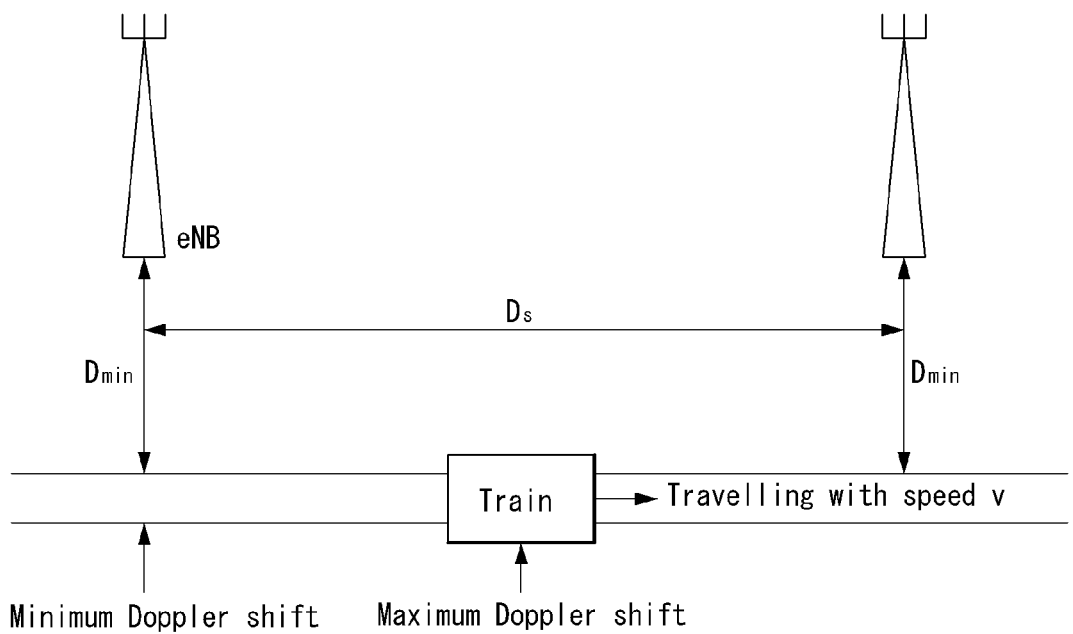

[FIG. 9]
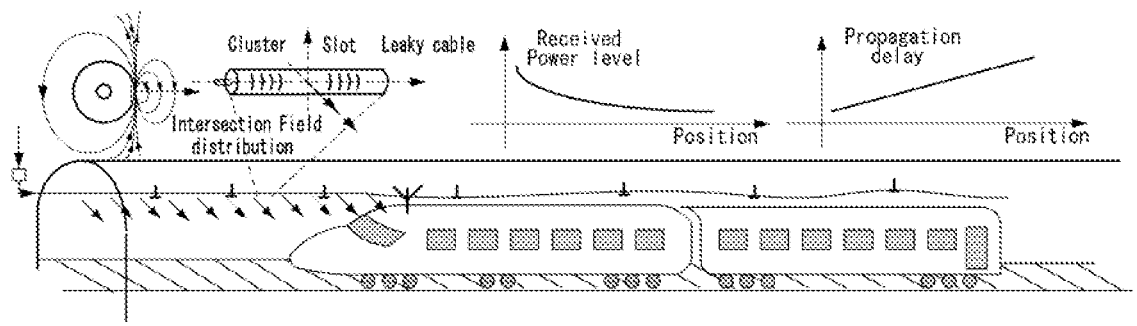

[FIG. 10]
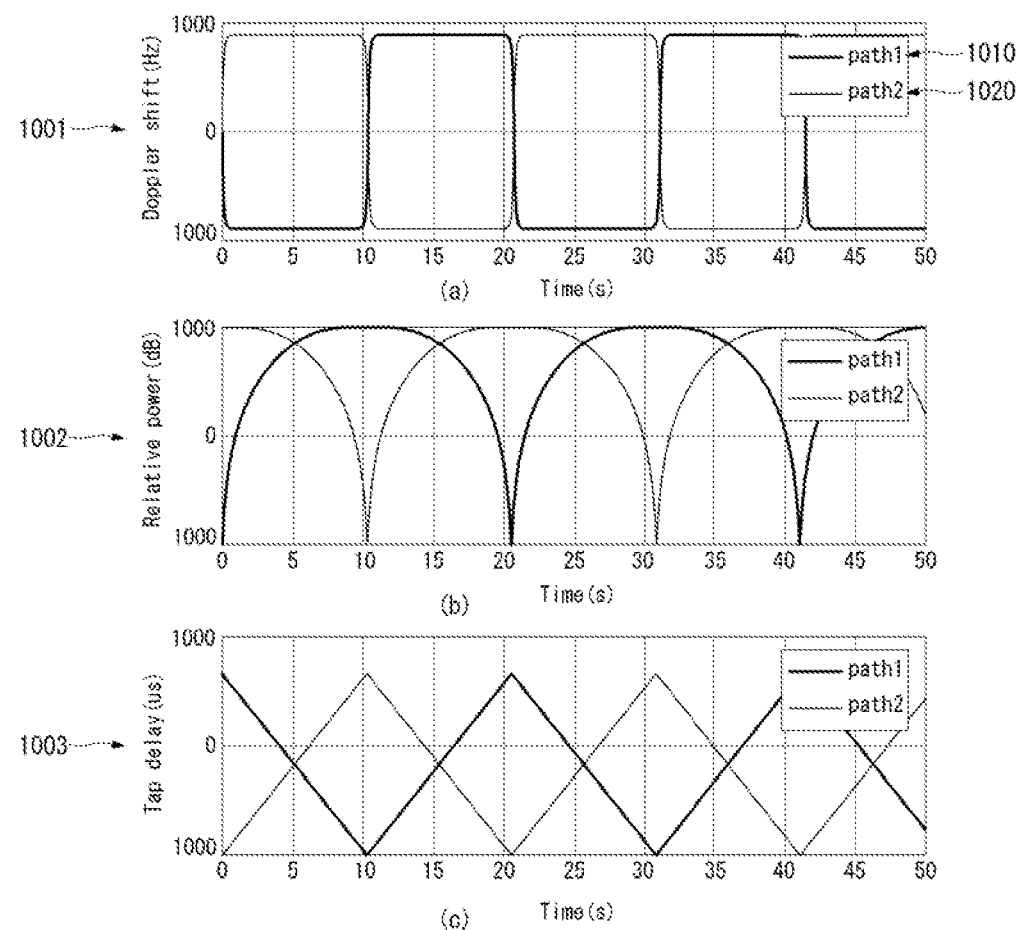

【FIG. 11】
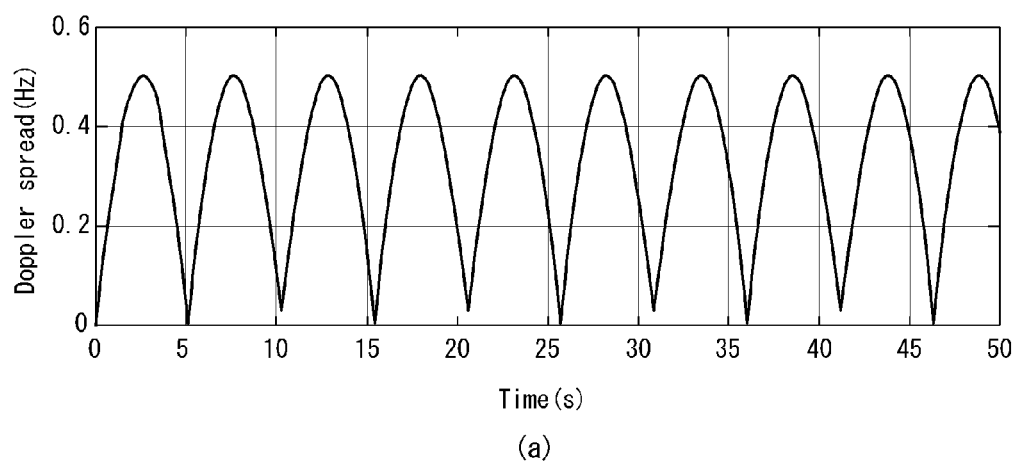
(a)
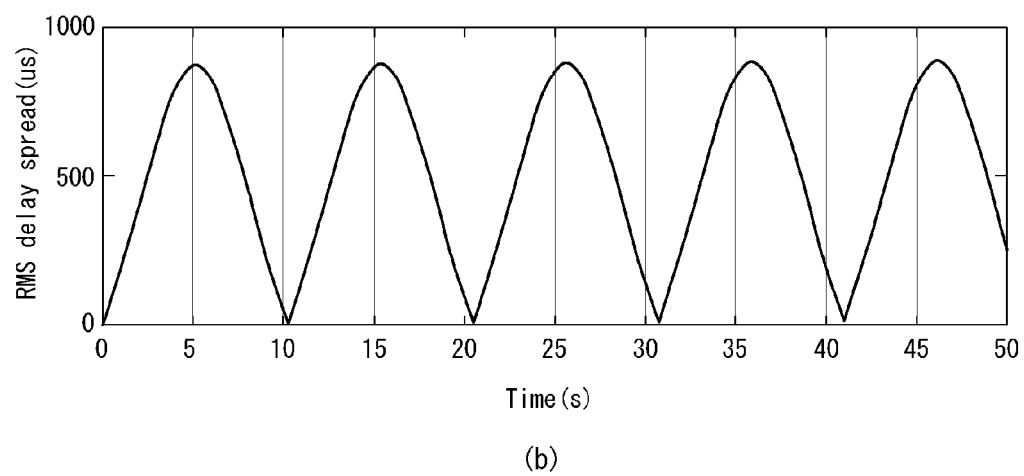
(b)

[FIG. 12]
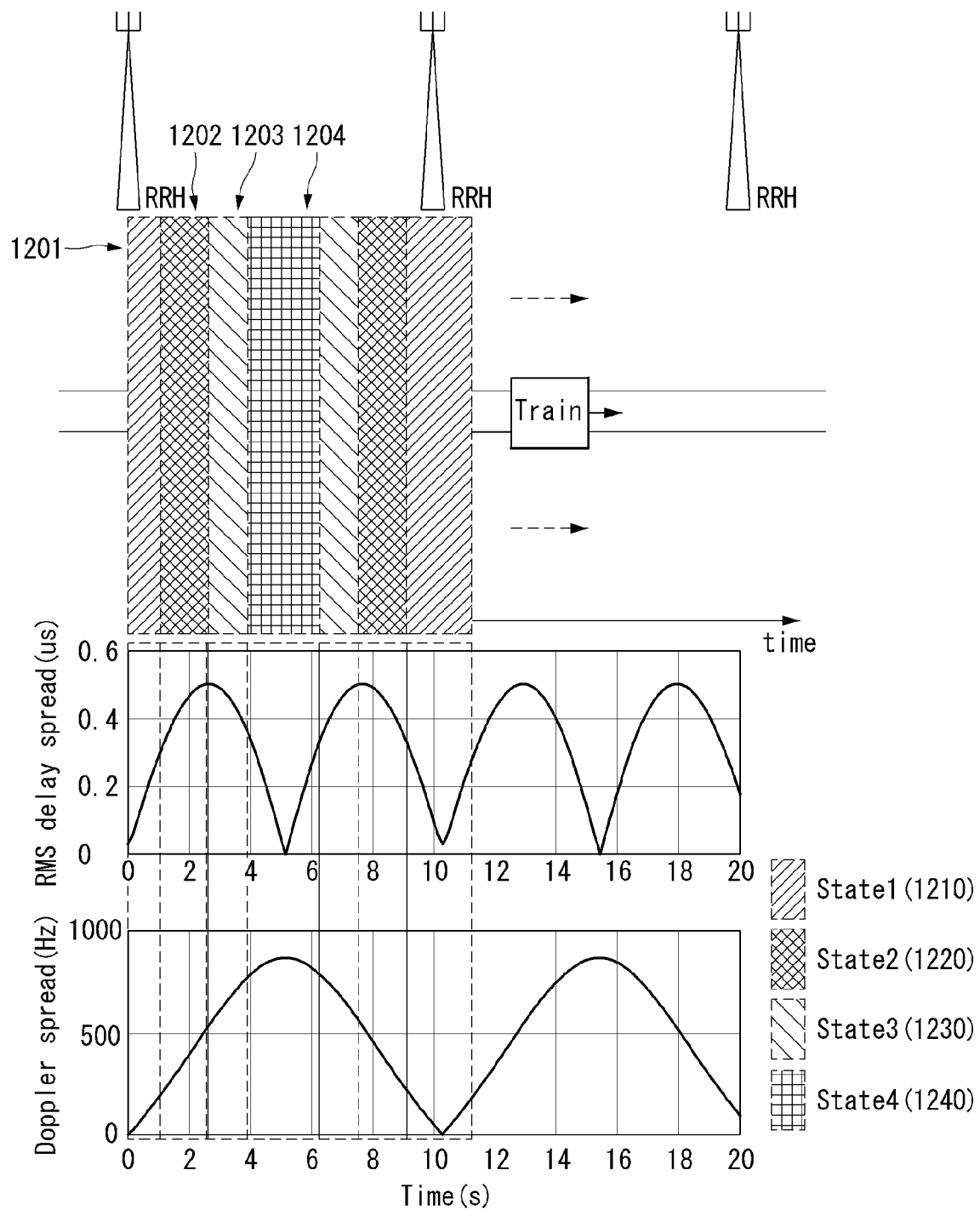

[FIG. 13]
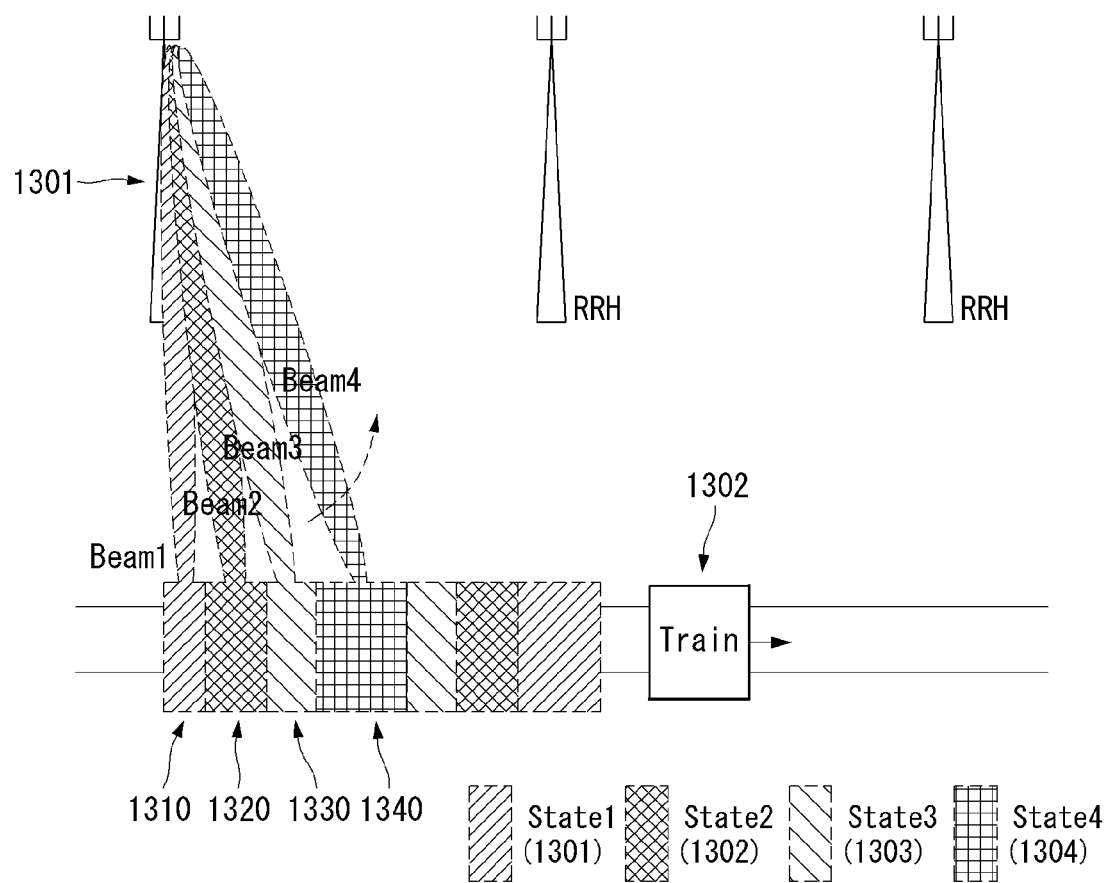

[FIG. 14]
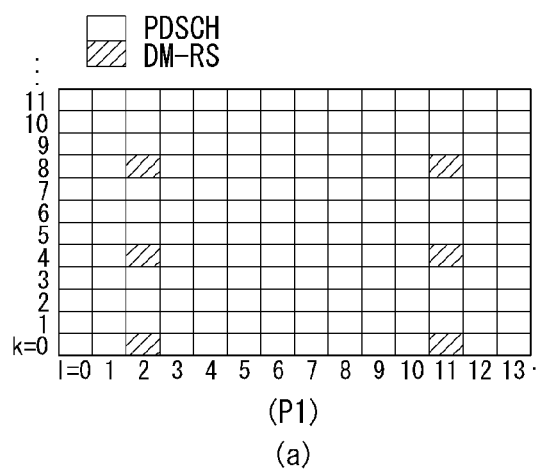
(P1)
(a)
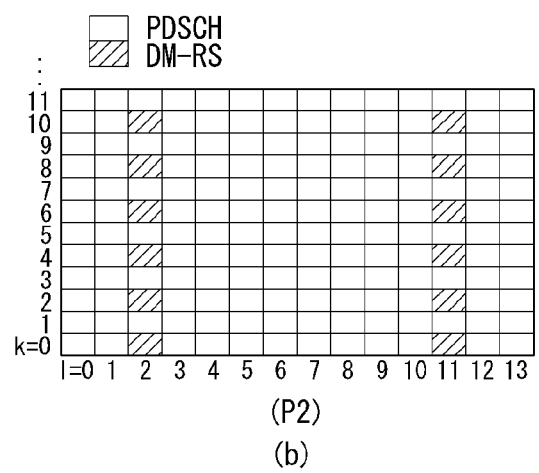
(P2)
(b)
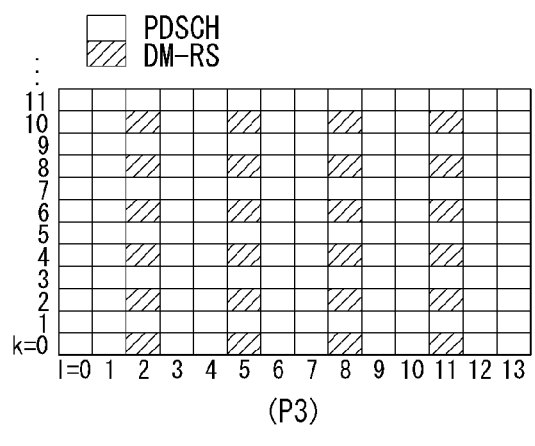
(P3)
(c)
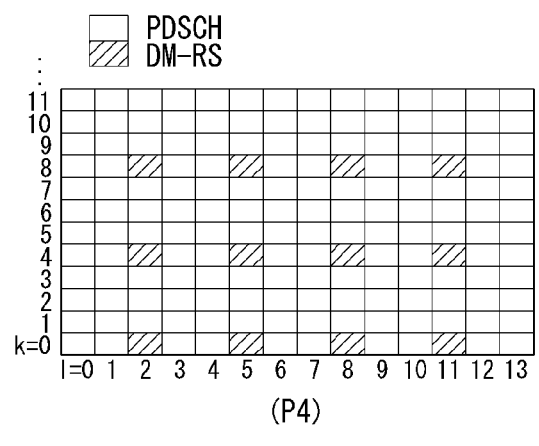
(P4)
(d)

【FIG. 15】
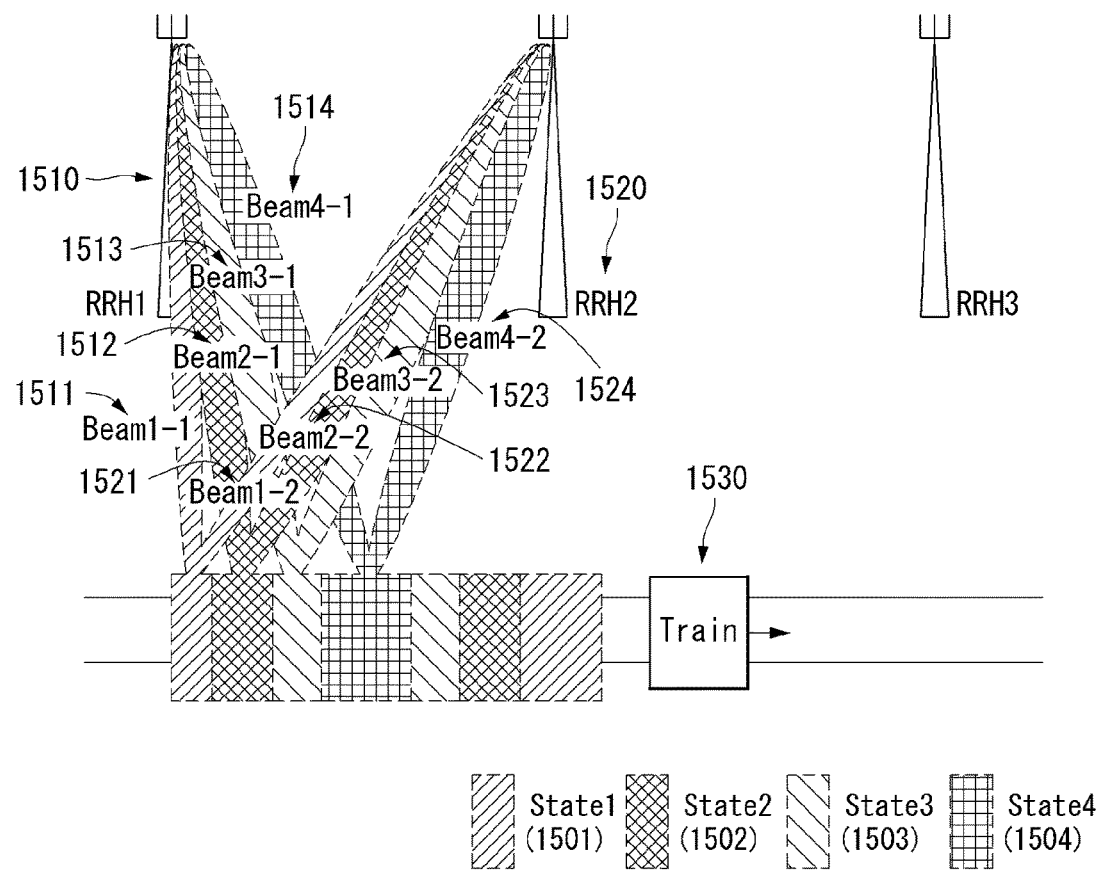

[FIG. 16]
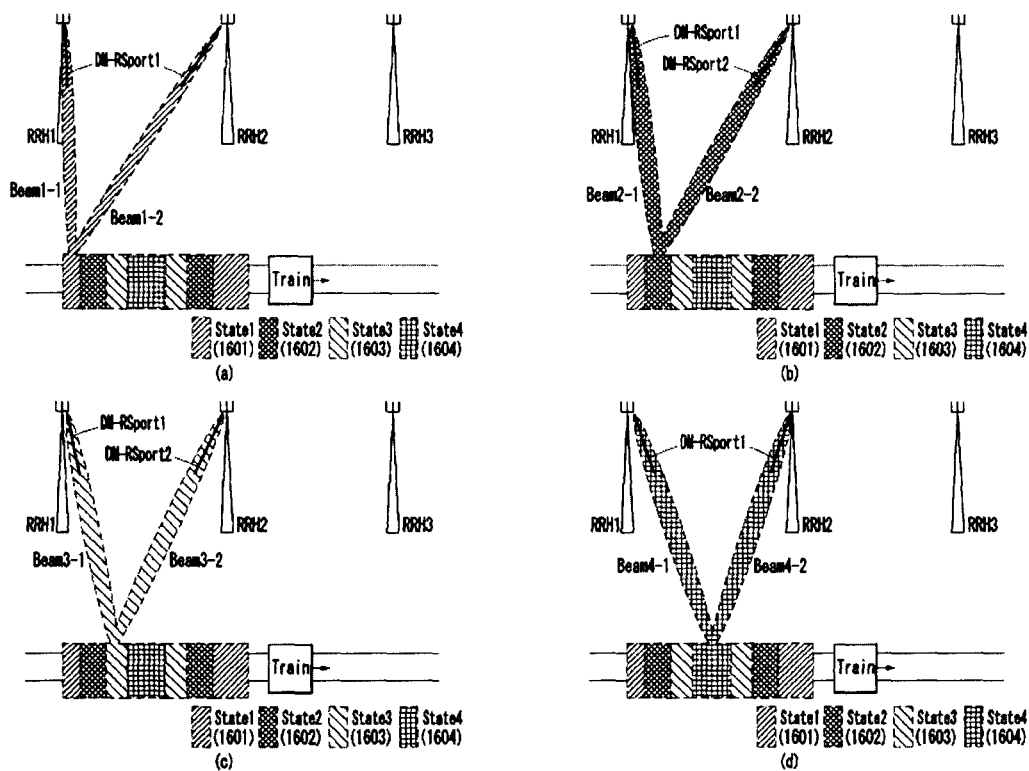

【FIG. 17】
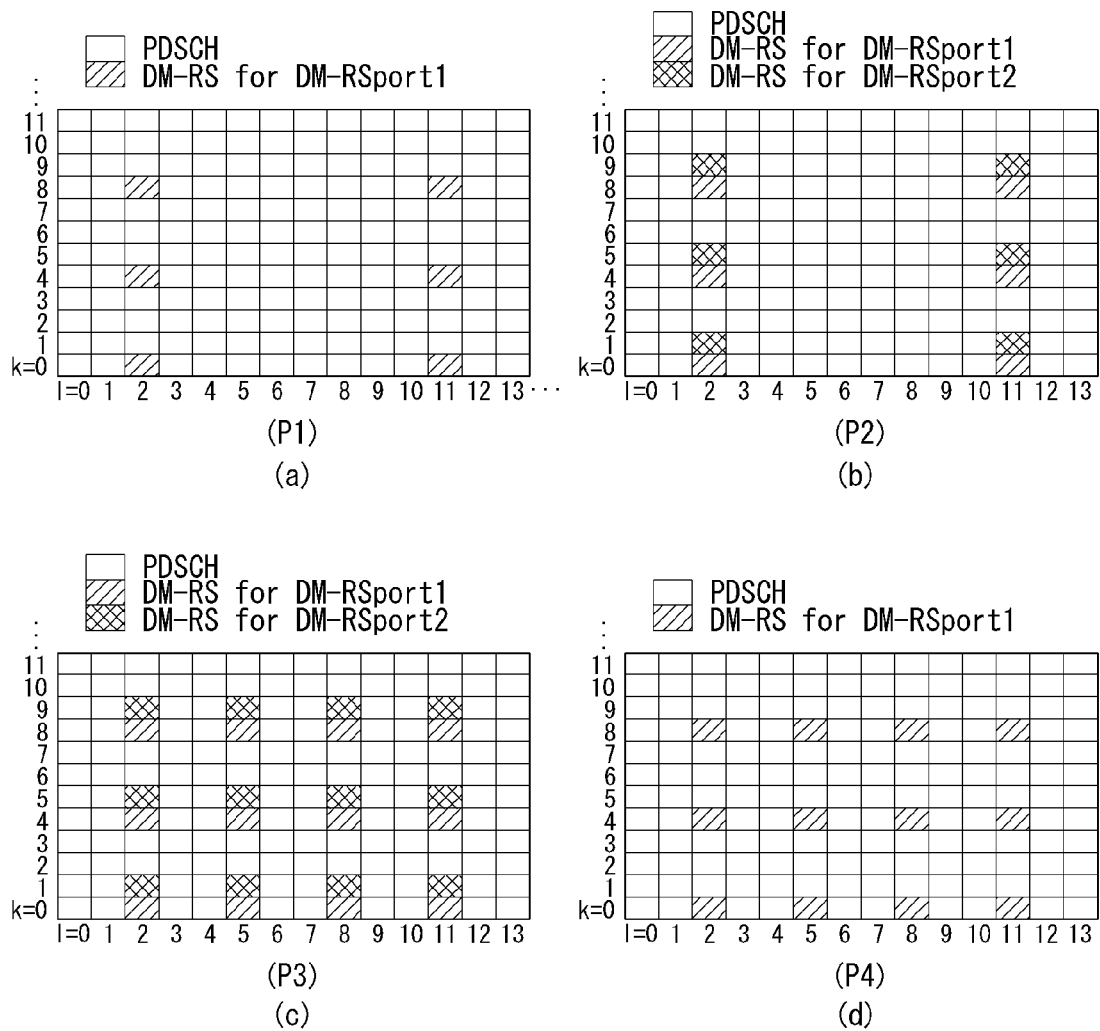

[FIG. 18]
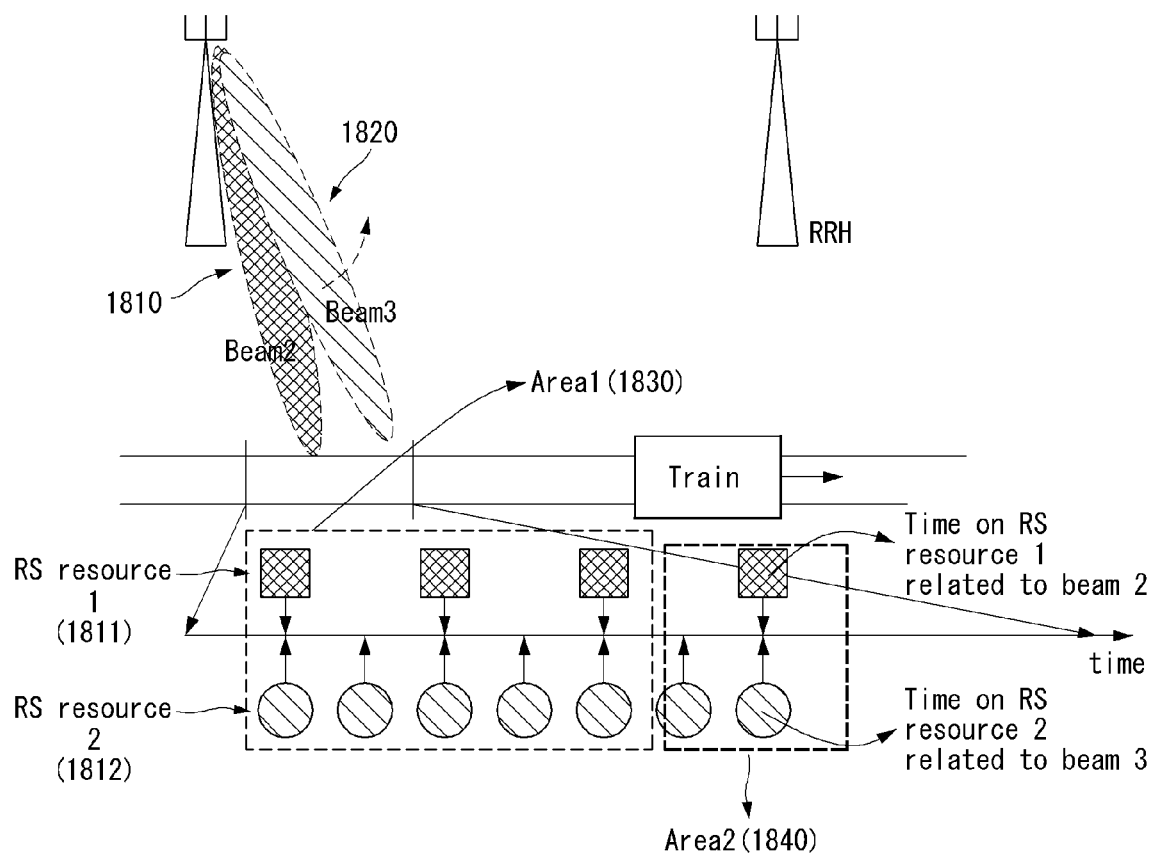

[FIG. 19]
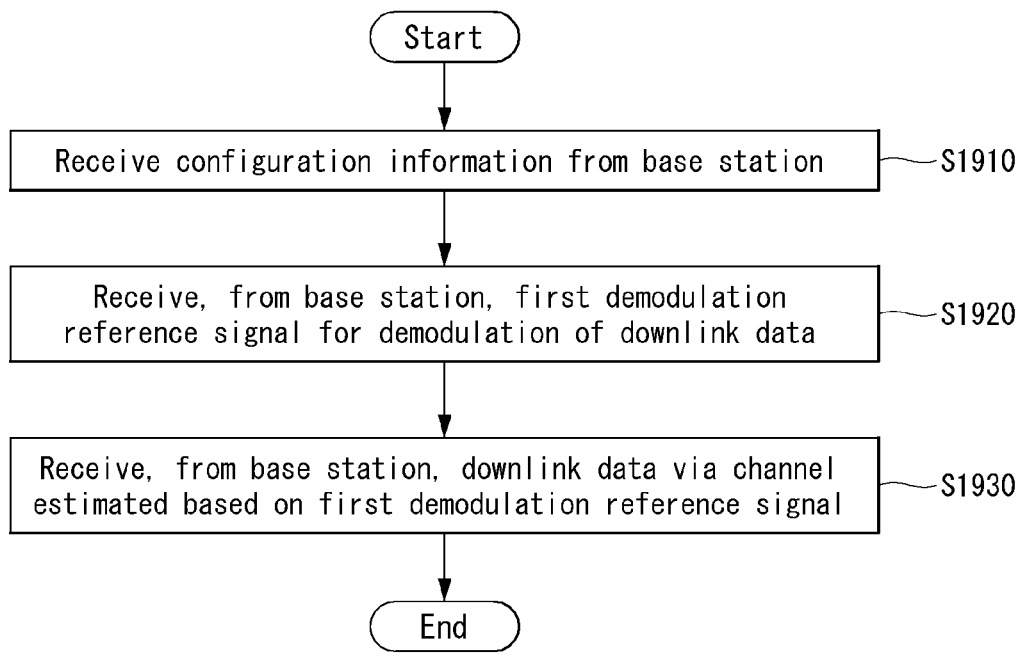
[FIG. 20]
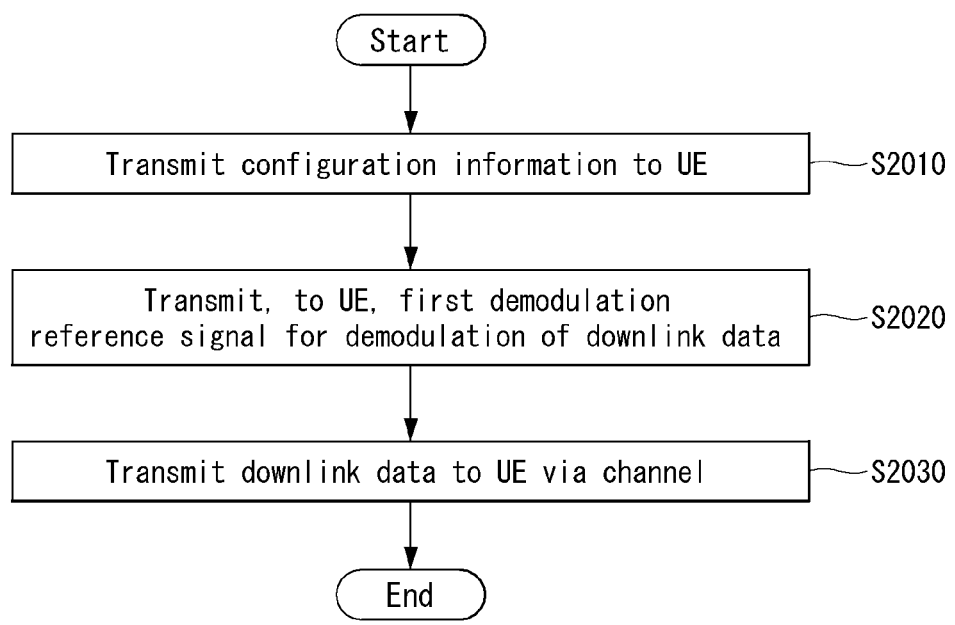

[FIG. 21]
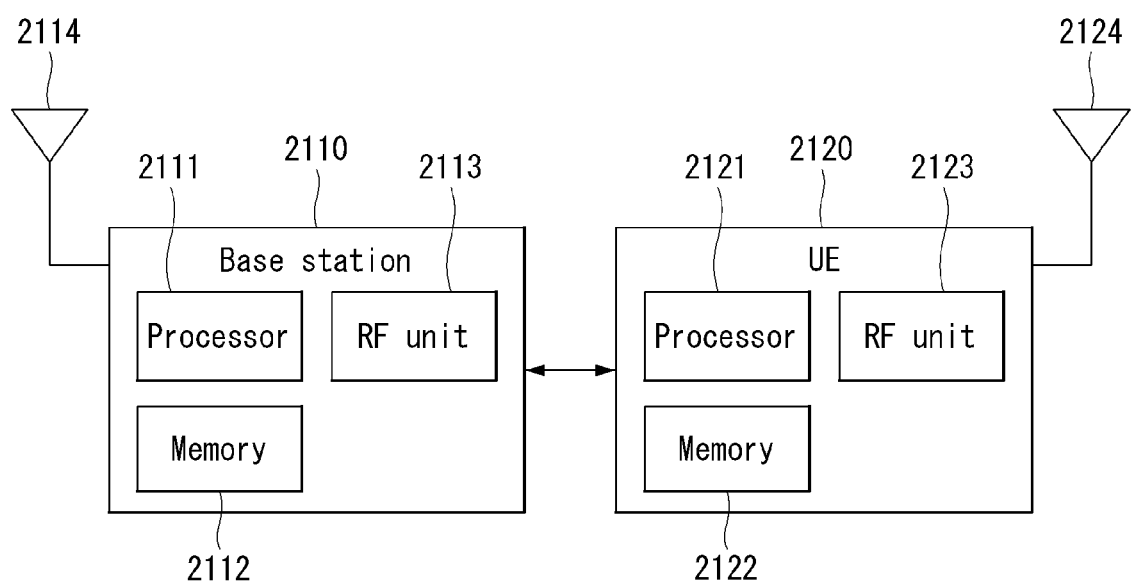

[FIG. 22]
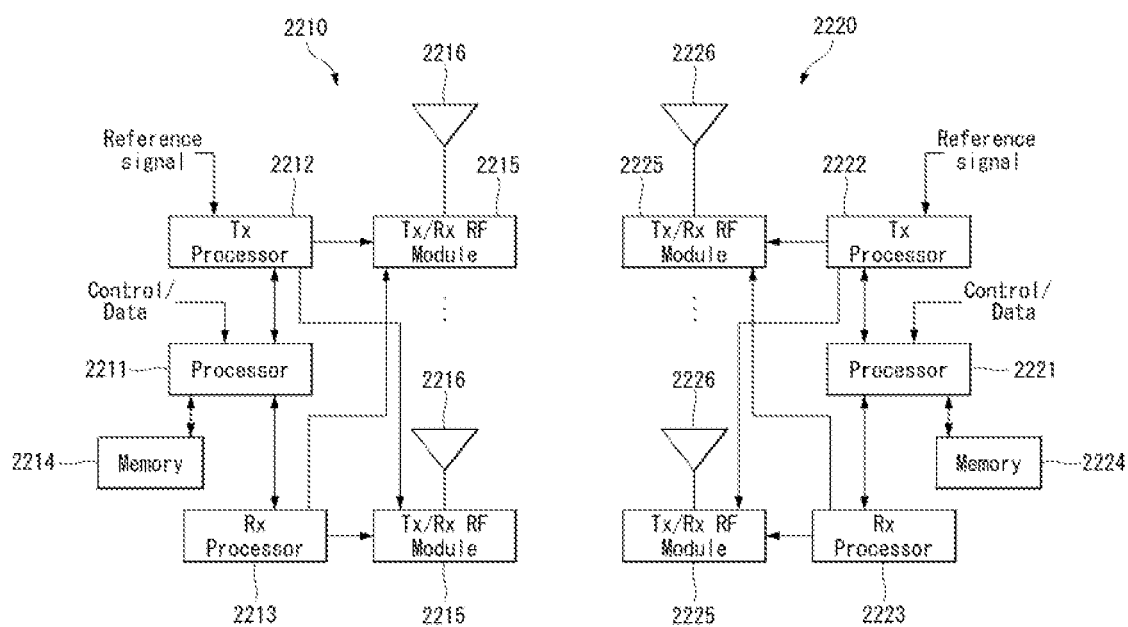

[FIG. 23]
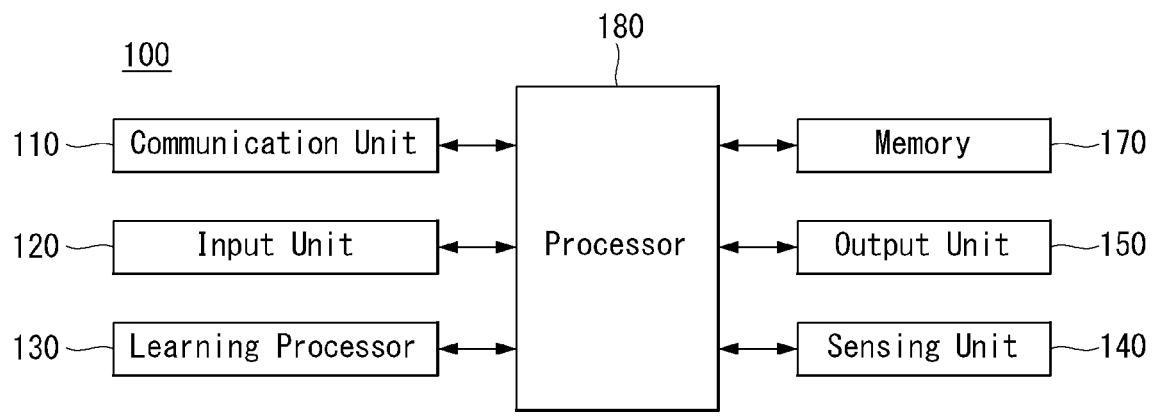
[FIG. 24]
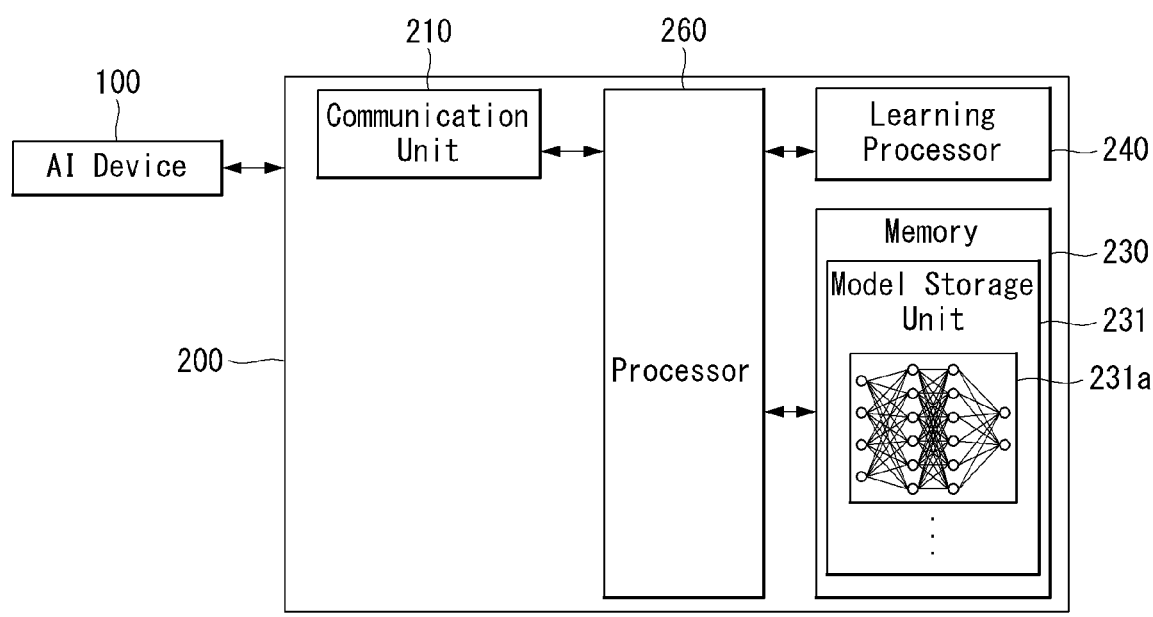

[FIG. 25]
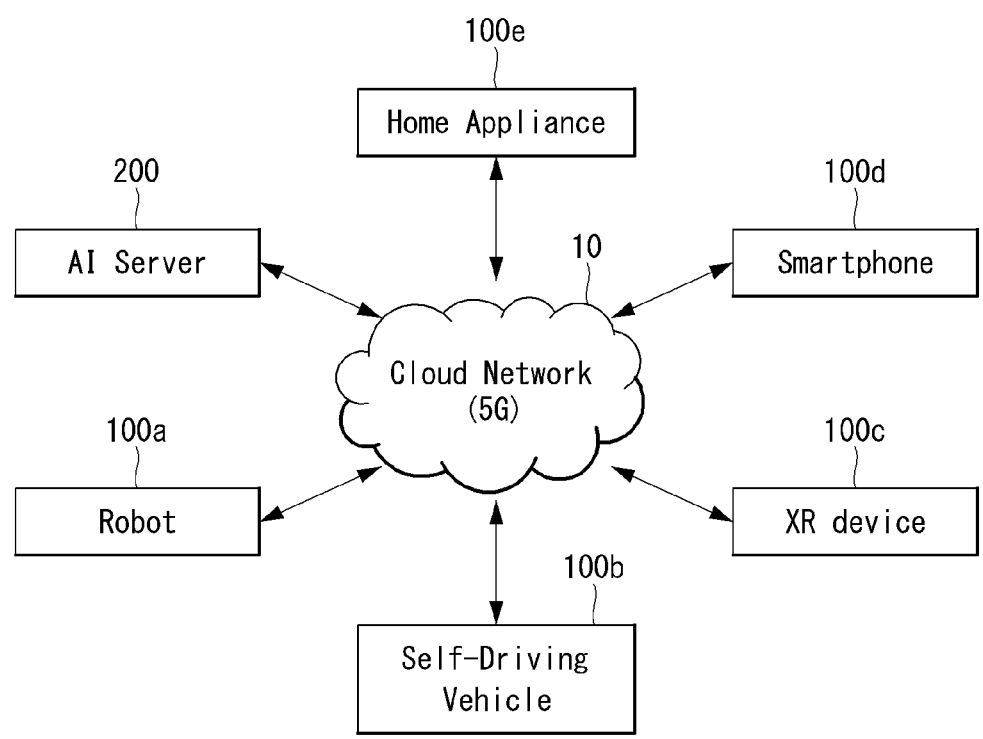

METHOD FOR ADAPTIVELY SETTING REFERENCE SIGNAL PATTERN IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2019/006964, filed on Jun. 10, 2019, which claims the benefit of earlier filing date and right of priority to Korean Application No. 10-2018-0065786, filed on Jun. 8, 2018, the contents of which are all incorporated by reference herein in their entirety.

TECHNICAL FIELD

The present disclosure relates to a wireless communication system, and more particularly to a method for adaptively configuring a reference signal pattern in a high speed train scenario and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present disclosure is to provide a method for configuring a suitable reference signal (RS) pattern according to channel characteristics changing depending on a moving section of a user equipment (UE) in a wireless communication system.

Another object of the present disclosure is to provide a method for configuring a suitable beam according to channel characteristics changing depending on a moving section of a UE in a wireless communication system.

Another object of the present disclosure is to provide a method for configuring a suitable demodulation-reference signal (DM-RS) pattern depending on a beam supporting a UE in a wireless communication system.

Another object of the present disclosure is to provide a method for reducing an overhead of a reference signal through configuration of a suitable demodulation-reference signal (DM-RS) pattern depending on a beam supporting a UE in a wireless communication system.

Another object of the present disclosure is to provide a method for improving a spectral efficiency through configuration of a suitable demodulation-reference signal (DM-RS) pattern depending on a beam supporting a UE in a wireless communication system.

Another object of the present disclosure is to provide a method for improving a system performance by reducing an overhead of a reference signal and improving a spectral efficiency in a wireless communication system.

The technical problems of the present disclosure are not limited to the aforementioned technical problems, and other technical problems which are not mentioned above will be apparently appreciated by a person having ordinary skill in the art from the following description.

Technical Solution

In one aspect of the present disclosure, there is provided a method for a user equipment (UE) to receive a reference signal from a base station in a wireless communication system, the method comprising receiving, from the base station, configuration information, wherein the configuration information includes first mapping information related to a mapping relationship between a plurality of mapping patterns, to which dedicated demodulation reference signals are mapped on a resource, and a plurality of transmission beams through which the dedicated demodulation reference signals are transmitted; receiving, from the base station, a first demodulation reference signal related to a demodulation of downlink data; and receiving, from the base station, the downlink data via a channel estimated based on the first demodulation reference signal, wherein the downlink data and the first demodulation reference signal are transmitted through at least one different transmission beam of the base station, wherein a first mapping pattern of the first demodulation reference signal is determined based on the at least one different transmission beam according to the first mapping information.

The method further comprises receiving, from the base station, downlink control information (DCI) including first transmission beam information related to the at least one different transmission beam.

The at least one different transmission beam is determined based on channel characteristics of a channel on which the downlink data is transmitted.

The channel characteristics are determined by Doppler spread and delay spread.

The configuration information is included in a system information message. The first transmission beam information is included in a transmission configuration indication (TCI)-state that is a higher layer parameter included in the DCI.

A pattern identifier (ID) representing the first mapping pattern is included in a TCI-state that is a higher layer parameter included in the DCI.

The method further comprises receiving, from the base station, second transmission beam information related to a transmission beam for a transmission of the DCI.

The first transmission beam information is first quasi co-location (QCL) relationship information between an antenna port for a transmission of the downlink data and an antenna port for a transmission of a first specific reference signal. The second transmission beam information is second QCL relationship information between an antenna port for a transmission of the DCI and an antenna port for a transmission of a second specific reference signal.

The first mapping pattern is determined based on the first QCL relationship information. A second mapping pattern to which a second demodulation reference signal related to a demodulation of the DCI is mapped is determined based on the second QCL relationship information.

The first mapping pattern and a second mapping pattern to which a second demodulation reference signal related to a demodulation of the DCI is mapped are determined based on the second QCL relationship information.

The configuration information further includes second mapping information related to a mapping relationship between a number of antenna ports on which the dedicated demodulation reference signals are transmitted and the plurality of transmission beams through which the dedicated demodulation reference signals are transmitted. A number of antenna ports on which the first demodulation reference signal is transmitted is determined based on the first transmission beam information according to the second mapping information.

The configuration information is included in a system information message. The first transmission beam information is included in a TCI-state that is a higher layer parameter included in the DCI.

An indicator representing whether the first demodulation reference signal is transmitted via a plurality of antenna ports is included in a TCI-state that is a higher layer parameter included in the DCI.

The method further comprises receiving, from the base station, a channel characteristic reference signal for detecting characteristics of a channel. The configuration information further includes third mapping information related to a mapping relationship between the plurality of mapping patterns, to which the dedicated demodulation reference signals are mapped on the resource and at least one different transmission periodicity of the channel characteristic reference signals. The first transmission beam information further includes transmission periodicity information related to a transmission periodicity of the channel characteristic reference signal. The first mapping pattern is determined based on the transmission periodicity information according to the third mapping information.

The configuration information is included in a system information message. The first transmission beam information is included in a TCI-state that is a higher layer parameter included in the DCI.

A pattern identifier (ID) representing the first mapping pattern is included in a parameter for configuring the at least one different transmission periodicity.

The transmission periodicity is differently configured per resource on which the channel characteristic reference signal is transmitted.

In another aspect of the present disclosure, there is provided a method for a base station to transmit a reference signal to a user equipment (UE) in a wireless communication system, the method comprising transmitting, to the UE, configuration information, wherein the configuration information includes first mapping information related to a mapping relationship between a plurality of mapping patterns, to which dedicated demodulation reference signals are mapped on a resource, and a plurality of transmission beams through which the dedicated demodulation reference signals are transmitted; transmitting, to the UE, a first demodulation reference signal related to a demodulation of downlink data; and transmitting, to the UE, the downlink data via a channel estimated based on the first demodulation reference signal, wherein the downlink data and the first demodulation reference signal are transmitted through at least one different transmission beam of the base station, wherein a first mapping pattern of the first demodulation reference signal is determined based on the at least one different transmission beam according to the first mapping information.

In another aspect of the present disclosure, there is provided a user equipment (UE) receiving a reference signal from a base station in a wireless communication system, the UE comprising a transmitter configured to transmit a radio signal; a receiver configured to receive the radio signal; and a processor functionally connected to the transmitter and the receiver, wherein the processor is configured to receive, from the base station, configuration information, wherein the configuration information includes first mapping information related to a mapping relationship between a plurality of mapping patterns, to which dedicated demodulation reference signals are mapped on a resource, and a plurality of transmission beams through which the dedicated demodulation reference signals are transmitted; receive, from the base station, a first demodulation reference signal related to a demodulation of downlink data; and receive, from the base station, the downlink data via a channel estimated based on the first demodulation reference signal, wherein the downlink data and the first demodulation reference signal are transmitted through at least one different transmission beam of the base station, wherein a first mapping pattern of the first demodulation reference signal is determined based on the at least one different transmission beam according to the first mapping information.

Advantageous Effects

The present disclosure has an effect of configuring a suitable reference signal (RS) pattern according to channel characteristics changing depending on a moving section of a UE in a wireless communication system.

The present disclosure has an effect of configuring a suitable beam according to channel characteristics changing depending on a moving section of a UE in a wireless communication system.

The present disclosure has an effect of configuring a suitable demodulation-reference signal (DM-RS) pattern depending on a beam supporting a UE in a wireless communication system.

The present disclosure has an effect of reducing an overhead of a reference signal through configuration of a suitable demodulation-reference signal (DM-RS) pattern depending on a beam supporting a UE in a wireless communication system.

The present disclosure has an effect of improving a spectral efficiency through configuration of a suitable demodulation-reference signal (DM-RS) pattern depending on a beam supporting a UE in a wireless communication system.

The present disclosure has an effect of improving a system performance by reducing an overhead of a reference signal and improving a spectral efficiency in a wireless communication system.

Advantages which can be obtained in the present disclosure are not limited to the aforementioned effects and other unmentioned advantages will be clearly understood by those skilled in the art from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 illustrates an example of an overall system structure of new RAT (NR) to which a method described in the present disclosure is applicable.

FIG. 2 illustrates a relationship between an uplink frame and a downlink frame in a wireless communication system to which a method described in the present disclosure is applicable.

FIG. 3 illustrates an example of a resource grid supported in a wireless communication system to which a method described in the present disclosure is applicable.

FIG. 4 illustrates examples of a resource grid per antenna port and numerology to which a method described in the present disclosure is applicable.

FIG. 5 illustrates a transceiver unit model in a wireless communication system to which the present disclosure is applicable.

FIG. 6 illustrates a hybrid beamforming structure in terms of TXRU and a physical antenna in a wireless communication system to which the present disclosure is applicable.

FIG. 7 illustrates an SSB structure to which the present disclosure is applicable.

FIG. 8 illustrates a channel model for open space and tunnel for multi-antennas in a wireless communication system to which the present disclosure is applicable.

FIG. 9 illustrates a channel model for leaky cable in tunnel in a wireless communication system to which the present disclosure is applicable.

FIG. 10 illustrates an example of channel characteristics of a channel model for signal single frequency network (SFN) in a wireless communication system to which the present disclosure is applicable.

FIG. 11 illustrates an example of time-variant characteristics of Doppler spread and delay spread in a SFN scenario in a wireless communication system to which the present disclosure is applicable.

FIG. 12 illustrates an example of time-variant characteristics of channel depending on a moving section of a UE in a wireless communication system to which the present disclosure is applicable.

FIG. 13 illustrates an example of applying different beams depending on a moving section of a UE in a wireless communication system to which the present disclosure is applicable.

FIG. 14 illustrates four cases of different DM-RS patterns assigned on a time/frequency resource in a wireless communication system to which the present disclosure is applicable.

FIG. 15 illustrates an example where beams supported by two remote radio heads (RRHs) correspond to each other in a specific section with a different channel characteristic on a moving path of a UE in a wireless communication system to which the present disclosure is applicable.

FIG. 16 illustrates an example of differently configuring the number of DM-RS antenna ports for transmission of the same data stream depending on a beam/beam group supporting a UE in a wireless communication system to which the present disclosure is applicable.

FIG. 17 illustrates an example of a DM-RS pattern capable of corresponding to a specific section according to a moving path of a UE in a wireless communication system to which the present disclosure is applicable.

FIG. 18 illustrates an example where two different channel state measurement reference signals, to which different beams are applied, are transmitted at different periodicities in a wireless communication system to which the present disclosure is applicable.

FIG. 19 illustrates an example of an operation of a UE described in the present disclosure in a wireless communication system to which the present disclosure is applicable.

FIG. 20 illustrates an example of an operation of a base station described in the present disclosure in a wireless communication system to which the present disclosure is applicable.

FIG. 21 illustrates a block configuration diagram of a wireless communication device in a wireless communication system to which the present disclosure is applicable.

FIG. 22 illustrates a block configuration diagram of a wireless communication device in a wireless communication system to which the present disclosure is applicable.

FIG. 23 illustrates an AI device according to an embodiment of the present disclosure in a wireless communication system to which the present disclosure is applicable.

FIG. 24 illustrates an AI server according to an embodiment of the present disclosure in a wireless communication system to which the present disclosure is applicable.

FIG. 25 illustrates an AI system according to an embodiment of the present disclosure in a wireless communication system to which the present disclosure is applicable.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA may be implemented using a radio technology, such as universal terrestrial radio access (UTRA) or CDMA2000. The TDMA may be implemented using a radio technology, such as global system for mobile communications (GSM)/general packet radio service (GPRS)/enhanced data rates for GSM evolution (EDGE). The OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). The UTRA is part of a universal mobile telecommunications system (UMTS). The 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

5G new radio (NR) defines enhanced mobile broadband (eMBB), massive machine type communications (mMTC), ultra-reliable and low latency communications (URLLC), and vehicle-to-everything (V2X) based on usage scenario.

5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by the standard documents disclosed in at least one of IEEE 802, 3GPP, and 3GPP2 which are radio access systems. That is, steps or parts, in embodiments of the present disclosure, which are not described to clearly show the technical spirit of the present disclosure can be supported by the standard documents. Further, all terms disclosed in the present disclosure can be described by the standard documents.

In order to clarify the description, embodiments are described focusing on 3GPP LTE/LTE-A/NR (New RAT), but the technical features of the present disclosure are not limited thereto.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall system structure of NR to which a method described in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or) μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In regard to a frame structure in the NR system, a size of various fields in a time domain is expressed as a multiple of a time unit of $T_s=1/(\Delta f_{max} \cdot N_f)$, where $\Delta f_{max}=480 \cdot 10^3$ and $N_f=4096$. Downlink and uplink transmissions are organized into radio frames with a duration of $T_f=(\Delta f_{max} N_f/100) \cdot T_s=10$ ms. Here, the radio frame consists of ten subframes each having a duration of $T_{sf}=(\Delta f_{max}N_f/1000)\cdot T_s=1$ ms. In this case, there may be a set of frames in the uplink and a set of frames in the downlink.

FIG. 2 illustrates a relationship between an uplink frame and a downlink frame in a wireless communication system to which a method described in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$ and $N_{symb}^\mu$ is determined depending on a numerology used and slot configuration. The start of slots $n_s^\mu$ in a subframe is aligned in time with the start of OFDM symbols $N_s^\mu N_{symb}^\mu$ in the same subframe.

Not all UEs are able to transmit and receive at the same time, and this means that not all OFDM symbols in a downlink slot or an uplink slot are available to be used.

Table 2 shows the number of OFDM symbols per slot for a normal CP in the numerology μ, and Table 3 shows the number of OFDM symbols per slot for an extended CP in the numerology μ.

channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method described in the present disclosure is applicable.

Referring to FIG. 3, a resource grid consists of $N_{RB}^\mu N_{sc}^{RB}$ subcarriers on a frequency domain, each subframe consisting of $14\cdot 2^\mu$ OFDM symbols, but the present disclosure is not limited thereto.

In the NR system, a transmitted signal is described by one or more resource grids consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. In addition, $N_{RB}^{max,\mu}$ denotes a maximum transmission bandwidth, and it may change not only between numerologies but also between uplink and downlink.

In this case, as illustrated in FIG. 4, one resource grid may be configured per numerology μ and antenna port p.

FIG. 4 illustrates examples of a resource grid per antenna port and numerology to which a method described in the present disclosure is applicable.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another Each element of the resource grid for the numerology μ and the antenna port p is called a resource element and is uniquely identified by an index pair (k,l̄), where k=0, ..., $N_{RB}^\mu N_{sc}^{RB}-1$ is an index on a frequency domain, and l̄=0, ..., $2^\mu N_{symb}^{(\mu)}-1$ refers to a location of a symbol in a subframe. The index pair (k,l̄) is used to refer to a resource element in a slot, where l=0, ..., $N_{symb}^\mu-1$.

The resource element (k,l̄) for the numerology μ and the antenna port p corresponds to a complex value $a_{k,l̄}^{(p,\mu)}$. When there is no risk for confusion or when a specific antenna port or numerology is not specified, the indices p and μ may be dropped, and as a result, the complex value may be $a_{k,l}^{(p)}$ or $a_{k,l}$.

Further, a physical resource block is defined as $N_{sc}^{RB}=12$ consecutive subcarriers on the frequency domain. On the frequency domain, physical resource blocks are numbered from 0 to $N_{RB}^{\mu}-1$. A relation between a physical resource block number $n_{PRB}$ on the frequency domain and the resource elements (k,l) is given by Equation 1.

$$n_{PRB} = \left\lfloor \frac{k}{N_{sc}^{RB}} \right\rfloor \quad \text{[Equation 1]}$$

In regard to a carrier part, a UE may be configured to receive or transmit the carrier part using only a subset of the resource grid. A set of resource blocks which the UE is configured to receive or transmit are numbered from 0 to $N_{URB}^{\mu}-1$ on the frequency domain.

Uplink Control Channel

Physical uplink control signaling should be able to carry at least hybrid-ARQ acknowledgements, CSI reports (possibly including beamforming information), and scheduling requests.

At least two transmission methods are supported for an UL control channel supported in an NR system.

The UL control channel can be transmitted in short duration around last transmitted UL symbol(s) of a slot. In this case, the UL control channel is time-division-multiplexed and/or frequency-division-multiplexed with an UL data channel within a slot. For the UL control channel in short duration, transmission over one symbol duration of a slot is supported.

Short uplink control information (UCI) and data are frequency-division-multiplexed both within a UE and between UEs, at least for the case where physical resource blocks (PRBs) for short UCI and data do not overlap.

In order to support time division multiplexing (TDM) of a short PUCCH from different UEs in the same slot, a mechanism is supported to inform the UE of whether or not symbol(s) in a slot to transmit the short PUCCH is supported at least above 6 GHz.

At least following is supported for the PUCCH in 1-symbol duration: 1) UCI and a reference signal (RS) are multiplexed in a given OFDM symbol in a frequency division multiplexing (FDM) manner if the RS is multiplexed, and 2) there is the same subcarrier spacing between downlink (DL)/uplink (UL) data and PUCCH in short-duration in the same slot.

At least a PUCCH in short-duration spanning 2-symbol duration of a slot is supported. In this instance, there is the same subcarrier spacing between DL/UL data and the PUCCH in short-duration in the same slot.

At least semi-static configuration, in which a PUCCH resource of a given UE within a slot. i.e., short PUCCHs of different UEs can be time-division multiplexed within a given duration in a slot, is supported.

The PUCCH resource includes a time domain, a frequency domain, and when applicable, a code domain.

The PUCCH in short-duration can span until an end of a slot from UE perspective. In this instance, no explicit gap symbol is necessary after the PUCCH in short-duration.

For a slot (i.e., DL-centric slot) having a short UL part, 'short UCI' and data can be frequency-division multiplexed by one UE if data is scheduled on the short UL part.

The UL control channel can be transmitted in long duration over multiple UL symbols so as to improve coverage. In this case, the UL control channel is frequency-division-multiplexed with the UL data channel within a slot.

UCI carried by a long duration UL control channel at least with a low peak to average power ratio (PAPR) design can be transmitted in one slot or multiple slots.

Transmission across multiple slots is allowed for a total duration (e.g. 1 ms) for at least some cases.

In the case of the long duration UL control channel, the TDM between the RS and the UCI is supported for DFT-S-OFDM.

A long UL part of a slot can be used for transmission of PUCCH in long-duration. That is, the PUCCH in long-duration is supported for both a UL-only slot and a slot having the variable number of symbols comprised of a minimum of 4 symbols.

For at least 1 or 2 UCI bits, the UCI can be repeated within N slots (N>1), and the N slots may be adjacent or may not be adjacent in slots where PUCCH in long-duration is allowed.

Simultaneous transmission of PUSCH and PUCCH for at least the long PUCCH is supported. That is, uplink control on PUCCH resources is transmitted even in the case of the presence of data. In addition to the simultaneous PUCCH-PUSCH transmission, UCI on the PUSCH is supported.

Intra-TTI slot frequency-hopping is supported.

DFT-s-OFDM waveform is supported.

Transmit antenna diversity is supported.

Both TDM and FDM between short duration PUCCH and long duration PUCCH are supported at least for different UEs in one slot. In a frequency domain, a PRB (or multiple PRBs) is a minimum resource unit size for the UL control channel. If hopping is used, a frequency resource and the hopping may not spread over a carrier bandwidth. Further, a UE-specific RS is used for NR-PUCCH transmission. A set of PUCCH resources is configured by higher layer signaling, and a PUCCH resource within the configured set is indicated by downlink control information (DCI).

As part of the DCI, it should be possible to dynamically indicate (at least in combination with RRC) the timing between data reception and hybrid-ARQ acknowledgement transmission. A combination of the semi-static configuration and (for at least some types of UCI information) dynamic signaling is used to determine the PUCCH resource for both 'long and short PUCCH formats'. Here, the PUCCH resource includes a time domain, a frequency domain, and when applicable, a code domain. The UCI on the PUSCH, i.e., using some of the scheduled resources for the UCI is supported in case of simultaneous transmission of UCI and data.

At least UL transmission of at least single HARQ-ACK bit is supported. A mechanism enabling the frequency diversity is supported. In case of ultra-reliable and low-latency communication (URLLC), a time interval between scheduling request (SR) resources configured for a UE can be smaller than a slot.

Beam Management

In NR, beam management is defined as follows.

Beam management: a set of L1/L2 procedures to acquire and maintain a set of TRP(s) and/or UE beams that can be used for DL and UL transmission/reception, which includes at least following aspects:

Beam determination: an operation for TRP(s) or UE to select its own transmission/reception beam Beam measurement: an operation for TRP(s) or UE to measure characteristics of received beamformed signals Beam reporting: an operation for UE to report information of beamformed signal based on beam measurement Beam sweeping: an operation of covering a spatial area using transmitted and/or received beams during a time interval in a predetermined way.

Also, the followings are defined as Tx/Rx beam correspondence at the TRP and the UE.

Tx/Rx beam correspondence at TRP holds if at least one of the followings is satisfied.

The TRP is able to determine a TRP reception beam for the uplink reception based on UE's downlink measurement on TRP's one or more transmission beams.

The TRP is able to determine a TRP Tx beam for the downlink transmission based on TRP's uplink measurement on TRP's one or more Rx beams.

Tx/Rx beam correspondence at UE holds if at least one of the followings is satisfied.

The UE is able to determine a UE Tx beam for the uplink transmission based on UE's downlink measurement on UE's one or more Rx beams.

The UE is able to determine a UE reception beam for the downlink reception based on TRP's indication based on uplink measurement on UE's one or more Tx beams.

Capability indication of UE beam correspondence related information to TRP is supported.

The following DL L1/L2 beam management procedures are supported within one or multiple TRPs.

P-1: is used to enable UE measurement on different TRP Tx beams so as to support selection of TRP Tx beams/UE Rx beam(s).

In case of beamforming at the TRP, it generally includes intra/inter-TRP Tx beam sweep from a set of different beams. For beamforming at the UE, it typically includes UE Rx beam sweep from a set of different beams.

P-2: is used to enable UE measurement on different TRP Tx beams to change inter/intra-TRP Tx beam(s).

P-3: is used to enable UE measurement on the same TRP Tx beam to change UE Rx beam in the case where the UE uses beamforming.

At least network triggered aperiodic reporting is supported under P-1, P-2, and P-3 related operations.

The UE measurement based on an RS for the beam management (at least CSI-RS) is composed of K beams (where K is a total number of beams), and the UE reports measurement results of N selected Tx beams, where N is not necessarily fixed number. A procedure based on an RS for mobility purpose is not precluded. Reporting information at least includes measurement quantities for N beam(s) and information indicating N DL transmission beam(s), if N<K. Specifically, for K'>1 non-zero power (NZP) CSI-RS resources of the UE, the UE can report N' CRI (CSI-RS resource indicator).

The UE can be configured with the following higher layer parameters for beam management.

N=1 reporting settings, M≥1 resource settings

Links between reporting settings and resource settings are configured in the agreed CSI measurement setting.

CSI-RS based P-1 and P-2 are supported with resource and reporting settings.

P-3 can be supported with or without the reporting setting.

A reporting setting including at least the followings

Information indicating selected beam

L1 measurement reporting

Time domain behavior (e.g. aperiodic operation, periodic operation, and semipersistent operation)

Frequency granularity if several frequency granularities are supported

A resource setting including at least the followings

Time domain behavior (e.g. aperiodic operation, periodic operation, and semipersistent operation)

RS type: at least NZP CSI-RS

At least one CSI-RS resource set. Each CSI-RS resource set includes K≥1 CSI-RS resources (some parameters of K CSI-RS resources may be the same. For example, port number, time domain behavior, density and periodicity).

Also, NR supports the following beam reporting considering L groups, where L>1.

Information indicating at least group

Measurement quantity for N1 beam (supporting of L1 RSRP and CSI report (when CSI-RS is for CSI acquirement))

Information indicating $N_1$ DL transmission beam, if applicable

The above-described group based beam reporting can be configured per UE basis. The above group based beam reporting can be turned off per UE basis (e.g. when L=1 or $N_1$=1).

NR supports that the UE can trigger a mechanism recovering from a beam failure.

A beam failure event occurs when the quality of beam pair link(s) of an associated control channel is low enough (e.g. comparison with a threshold value, time-out of an associated timer). The mechanism to recover from the beam failure (or beam obstacle) is triggered when the beam failure occurs.

A network explicitly configures to the UE with resources for transmitting UL signals for recovery purpose. Configurations of resources are supported where the base station is listening from all or some directions (e.g. random access region).

The UL transmission/resources to report the beam failure can be located at the same time instance as PRACH (resources orthogonal to PRACH resources) or at a time instance (configurable for the UE) different from the PRACH. The transmission of DL signal is supported for allowing the UE to monitor beams for identifying new potential beams.

NR supports the beam management regardless of a beam-related indication. When the beam-related indication is provided, information pertaining to a UE-side beamforming/receiving procedure used for CSI-RS-based measurement can be indicated to the UE through QCL. As QCL parameters to support in NR, a spatial parameter for beamforming at a receiver will be added as well as parameters for delay, Doppler, average gain, etc. that have been used in a LTE system. The QCL parameters may include angle-of-arrival related parameters from UE reception beamforming perspective and/or angle-of-departure related parameters from base station reception beamforming perspective. NR supports using the same beam or different beams on control channel and corresponding data channel transmissions.

For NR-PDCCH (physical downlink control channel) transmission supporting robustness against beam pair link blocking, the UE can be configured to monitor NR-PDCCH on M beam pair links simultaneously, where M≥1 and a maximum value of M may depend on at least UE capability.

The UE can be configured to monitor NR-PDCCH on different beam pair link(s) in different NR-PDCCH OFDM symbols. Parameters related to UE Rx beam setting for monitoring NR-PDCCH on multiple beam pair links are configured by higher layer signaling or MAC CE and/or considered in a search space design.

At least, NR supports an indication of spatial QCL assumption between DL RS antenna port(s) and DL RS antenna port(s) for demodulation of DL control channel. Candidate signaling methods for beam indication for a NR-PDCCH (i.e. configuration method to monitor NR-PDCCH) are MAC CE signaling, RRC signaling, DCI signaling, specification-transparent and/or implicit method, and combination of these signaling methods.

For reception of unicast DL data channel, NR supports an indication of spatial QCL assumption between a DL RS antenna port and a DMRS antenna port of DL data channel.

Information indicating an RS antenna port is indicated via DCI (downlink grant). The information indicates the RS antenna port which is QCL-ed with the DMRS antenna port. A different set of DMRS antenna ports for the DL data channel can be indicated as QCL with a different set of RS antenna ports.

Analog Beamforming

In millimeter wave (mmW), since wavelength becomes short, multiple antenna elements can be installed in the same area. That is, the wavelength in 30 GHz band is 1 cm, and thus a total of 64 (8×8) antenna elements can be installed in the form of two-dimensional (2D) array at 0.5 lambda (i.e., wavelength) intervals on a 4×4 (4 by 4) cm panel. Therefore, in the mmW, a beamforming (BF) gain increases by using the multiple antenna elements to increase coverage or improve throughput.

In this case, if a transceiver unit (TXRU) is provided for each antenna element to adjust transmission power and phase, independent beamforming is available for each frequency resource. However, installing the TXRUs to all the about 100 antenna elements has a problem of poor effectiveness in terms of cost. Therefore, a method for mapping multiple antenna elements to one TXRU and adjusting a direction of beam using an analog phase shifter is under consideration. Such an analog beamforming method has a drawback in that it is not able to perform frequency selective beamforming since only one beam direction is allowed throughout the whole frequency band.

As an intermediate form of a digital BF and an analog BF, a hybrid BF having B TXRUs of which the number is smaller than the Q antenna elements may be considered. In this case, the number of directions of beams that can be transmitted at the same time is limited to be B or less, even though there is a difference depending on a method for connecting the B TXRUs and the Q antenna elements.

Typical examples of a method for connecting TXRUs and antenna elements are described below with reference to figures.

FIG. 5 illustrates a transceiver unit model in a wireless communication system to which the present disclosure is applicable.

A TXRU virtualization model represents a relationship between output signals of TXRUs and output signals of antenna elements. Depending on a correlation between the antenna elements and the TXRUs, the TXRU virtualization model may be divided into a TXRU virtualization model option-1: sub-array partition model as illustrated in FIG. 5(a) and or as a TXRU virtualization model option-2: full-connection model as illustrated in FIG. 5(b).

Referring to FIG. 5(a), in the sub-array partition model, the antenna elements are divided into multiple antenna element groups, and each TXRU is connected to one of the antenna element groups. In this case, the antenna elements are connected to only one TXRU.

Referring to FIG. 5(b), in the full-connection model, signals of multiple TXRUs are combined and sent to a single antenna element (or array of antenna elements). That is, this shows a method in which the TXRU is connected to all the antenna elements. In this case, the antenna elements are connected to all the TXRUs.

In FIG. 5, q denotes a transmitted signal vector of M co-polarized antenna elements in one column, w denotes a wideband TXRU virtualization weight vector, and W denotes a phase vector to be multiplied by an analog phase shifter. That is, a direction of analog beamforming is determined by W. In addition, x denotes a signal vector of TXRUs in which the number is M_TXRU.

Herein, mapping of the antenna ports and the TXRUs may be of 1-to-1 or 1-to-many.

FIG. 5 illustrates merely an example of the mapping between the TXRUs and the antenna elements, and the present disclosure is not limited thereto. The mapping can be equally applied to mapping of TXRUs and antenna elements which can be implemented in various forms from the hardware perspective.

Furthermore, a hybrid beamforming method that combines digital beamforming and analog beamforming is emerging when multiple antennas are used in the New RAT system. In this instance, analog beamforming (or radio frequency (RF) beamforming) means an operation that performs precoding (or combining) at a RF end. In the hybrid beamforming, a baseband end and the RF end each perform precoding (or combining), and hence have an advantage in that performance comparable to that of digital beamforming can be obtained while reducing the number of RF chains and the number of digital/analog (D/A) (or A/D) converters. For the sake of convenience, a hybrid beamforming structure may be expressed by N transceiver units (TXRUs) and M physical antennas. Then, digital beamforming for L data layers to be transmitted from a transmitting end may be expressed by an N by L matrix, and N converted digital signals are converted to analog signals via the TXRUs, after which analog beamforming expressed by an M by N matrix is applied.

FIG. 6 illustrates a hybrid beamforming structure in terms of TXRU and a physical antenna in a wireless communication system to which the present disclosure is applicable.

Specifically, FIG. 6 illustrates a case where the number of digital beams is L, and the number of analog beams is N.

The New RAT system is designed so that a base station can change the analog beamforming on a per symbol basis in an attempt to support more efficient beamforming for UEs located in a specific region. Furthermore, as illustrated in FIG. 6, when N specific TXRUs and M RF antennas are defined as one antenna panel, the New RAT system even considers adopting a plurality of antenna panels to which independent hybrid beamforming is applicable.

Bandwidth Part (BWP)

The NR system may support up to 400 MHz per component carrier (CC). If a UE operating in wideband CC operates while continuously turning on RF for all CCs, UE battery consumption may increase. Alternatively, when several use cases (e.g., eMBB, URLLC, Mmtc, V2X, etc.) which operate in one wideband CC are considered, different numerologies (e.g., sub-carrier spacing) may be supported for each frequency band in the corresponding CC. Alternatively, a capability for the maximum bandwidth may vary for each UE. Considering this, the base station may indicate the UE to operate only in a partial bandwidth not the entire bandwidth of the wideband CC and may define the corresponding partial bandwidth as a bandwidth part (BWP) for convenience. The BWP may consist of consecutive resource blocks (RBs) on the frequency axis and may correspond to one numerology (e.g., sub-carrier spacing, CP length, slot/mini-slot duration).

The base station may configure multiple BWPs even in one CC configured to the UE.

For example, a BWP occupying a relatively small frequency domain may be configured in a PDCCH monitoring slot, and a PDSCH indicated in a PDCCH may be scheduled on a BWP larger than it.

Alternatively, when UEs are concentrated on a specific BWP, some UEs may be configured to other BWPs for load balancing.

Alternatively, considering frequency domain inter-cell interference cancellation between neighboring cells, a partial middle spectrum of the entire bandwidth may be excluded, and both BWPs may be configured even in the same slot.

In other words, the base station may configure at least one DL/UL BWP to the UE associated with the wideband CC and activate at least one DL/UL BWP (via L1 signaling or MAC CE or RRC signaling, etc.) of configured DL/UL BWP(s) at a specific time, and switching may be indicated to other configured DL/UL BWP (via L1 signaling or MAC CE or RRC signaling, etc.) or a timer value may be switched to the fixed DL/UL BWP if the timer value is expired based on a timer.

In this case, the activated DL/UL BWP is defined as an active DL/UL BWP. However, in a situation in which the UE is in an initial access process or before RRC connection is set up, the UE may not receive a configuration for the DL/UL BWP, and in such a situation, the DL/UL BWP assumed by the UE is defined as an initial active DL/UL BWP.

Uplink Control Information (UCI) Enhancement

URLLC service shall satisfy strict latency and reliability requirement.

In other words, if URLLC is defined so that HARQ-ACK feedback corresponding to a plurality of PDSCHs constructs HARQ-ACK codebook of PUCCH to be transmitted on one specific slot, it may not be desirable since a HARQ-ACK payload size becomes relatively larger, which may cause degradation of a PUCCH transmission performance.

Furthermore, in order to support latency-critical service, the plurality of PDSCHs with a short duration shall be able to be repeatedly transmitted even within a slot.

However, even if the plurality of PDSCHs are transmitted by scheduling of a base station, it may not be desirable since HARQ-ACK feedback transmission for back-to-back scheduling may be relatively delayed when up to one HARQ-ACK PUCCH transmission only is allowed within a slot. Thus, for the purpose of more flexible and efficient resource utilization and service support and more quick and robust UL channel transmission, a PUCCH (or PUSCH) including a plurality of HARQ-ACKs within a slot shall be able to be transmitted.

Scheduling/HARQ Processing Timeline

In general, PDSCH/PUSCH by earlier received PDCCH is received/transmitted earlier than PDSCH/PUSCH by later received PDCCH. Thus, in NR, out-of-order PDSCH/PUSCH scheduling is not allowed, and the UE is thus defined not to expect such a situation. Similar to this, out-of-order HARQ transmission/feedback is not allowed, and the UE is defined not to expect such a situation in the same manner as this.

For the UE with a traffic of various requirements (e.g., eMBB, URLLC), an operation, in which a later scheduled packet is processed earlier than an earlier scheduled packet, needs to be allowed to satisfy more strict latency requirements for a specific service (e.g., URLLC). Further, an operation, in which HARQ-ACK for the later scheduled packet is transmitted earlier than HARQ-ACK for the earlier scheduled packet, needs to be allowed.

Out-of-order scheduling means that for any two HARQ process IDs A and B for a given cell, if scheduling DCI scrambled to C-RNTI for unicast PUSCH transmission A comes before scheduling DCI scrambled to C-RNTI for unicast PUSCH transmission B, PDSCH/PUSCH for B is transmitted/received earlier than PDSCH/PUSCH for A.

Out-of-order HARQ-ACK means that for any two HARQ process IDs A and B for a given cell, scheduled unicast PDSCH transmission for A comes before unicast PDSCH transmission for B, and on the other hand, HARQ-ACK for B is expected to be transmitted earlier than HARQ-ACK for A.

Synchronization Signal Block (SSB)

FIG. 7 illustrates an SSB structure. A UE may perform cell search, system information acquisition, beam alignment for initial access, DL measurement, etc. based on an SSB. The SSB is mixedly used with synchronization signal (SS)/physical broadcast channel (PBCH) block.

Referring to FIG. 7, the SSB consists of PSS, SSS, and PBCH. The SSB consists of four consecutive OFDM symbols, and the PSS, the PBCH, the SSS/PBCH, and the PBCH are transmitted per OFDM symbol. The PSS and the SSS each consist of one OFDM symbol and 127 subcarriers, and the PBCH consists of 3 OFDM symbols and 576 subcarriers.

Polar coding and quadrature phase shift keying (QPSK) are applied to the PBCH. The PBCH consists of a data RE and a demodulation reference signal (DMRS) RE for each OFDM symbol. Three DMRS REs exist for each RB, and three data REs exist between DMRS REs.

High Speed Train Scenarios

In 3GPP Release 13 process, an RAN4 study item (SI) for the purpose of performance requirements enhancement in a high speed scenario (HST) has been approved.

In 3GPP TR 36.878 standard document, several practical high speed scenarios for cellular service support are summarized.

Among this scenarios, existing scenarios and scenarios with a high priority in the future may be classified as in the following Tables 4 and 5.

The following Table 4 represents existing scenarios.

TABLE 4

| Scenario | Description |
| --- | --- |
| Open space | Outdoor eNBs are installed through the railway on same frequencies as public network coverage. |
| Tunnel with leaky cable | Leaky cables are used to extend the signal through the tunnel environment. No repeaters/customer premise equipment (CPE) are installed on the carriage. |

TABLE 4-continued

| Scenario | Description |
| --- | --- |
| Tunnel for multi-antennas | Remote radio heads (RRHs) or radio access units (RAUs) are deployed through fiber in tunnel environment.<br>RRHs or RAUs share the different cell ID.<br>Repeaters are not installed on the carriage. |

The following Table 5 represents scenarios that should be preferentially considered in the future.

TABLE 5

| Scenario | Description |
| --- | --- |
| Signal single frequency network (SFN) Leaky cable in Tunnel (from leaky cable to repeater) | Remote Radio Heads (RRHs) or Radio Access Units (RAU) share the same cell ID.<br>Repeaters are not installed on the carriage.<br>Leaky cables are used to extend the signal through the tunnel environment.<br>Repeaters are installed on the carriage and distribute signal inside the carriage through leaky cables. |

Channel Models for High Speed Scenarios

A high speed scenario channel model has been devised for the analysis of a high speed scenario (HST).

As an example of the high speed scenario channel model, there are three models: a channel model for open space and tunnel for multi-antennas, a channel model for leaky cable in tunnel, and a channel model for SFN.

Channel Model for Open Space and Tunnel for Multi-Antennas

A first channel model is a channel model devised for a scenario such as an open space and a tunnel for multi-antennas.

The first channel model is a non-fading propagation channel model of one tap.

The one tap means that a signal transmitted from a transmitting end moves to a receiving end through one path.

Since the receiving end receives the signal moving through one path, frequency selective fading does not occur in an environment of the one tap.

The non-fading propagation means that a loss of a signal does not occur while the signal transmitted from a transmitting end is received at a receiving end.

The first channel model is characterized to have the following Doppler shift characteristics.

$$f_s(t) = f_d \cos \theta(t) \quad \text{[Equation 2]}$$

In the above Equation 2, $f_s(t)$ is the Doppler shift, and $f_d$ is the maximum Doppler frequency.

In addition, in the above Equation 2, $\cos \theta(t)$ may be classified as in the following Equations 3 and 4 depending on the range of t.

$$\cos\theta(t) = \frac{D_s/2 - vt}{\sqrt{D_{min}^2 + (D_s/2 - vt)^2}}, \quad 0 \le t \le D_s/v \quad \text{[Equation 3]}$$

$$\cos\theta(t) = \frac{-1.5D_s + vt}{\sqrt{D_{min}^2 + (-1.5D_s + vt)^2}}, \quad D_s/v < t \le 2D_s/v \quad \text{[Equation 4]}$$

$$\cos\theta(t) = \cos\theta(t \bmod (2D_s/v)), \quad t > 2D_s/v \quad \text{[Equation 5]}$$

FIG. 8 illustrates an example of the first channel model.

In FIG. 8, two adjacent base stations and a UE (e.g., train) are shown, and the UE (e.g., train) is moving at a velocity of v.

$D_{min}$ is a minimum distance between the base station and the UE (e.g., train), and $D_S$ is a distance between the adjacent base stations.

Channel Model for Leaky Cable in Tunnel

The second channel model is a channel model devised for a leaky cable scenario in tunnel (from leaky cable to repeater) defined in the above Table 5, and is characterized to have characteristics of the following Table 6.

TABLE 6

| Tap index | Excess tap delay (ns) | Relative power (dB) | Distribution of amplitude per tap | Doppler spectrum |
| --- | --- | --- | --- | --- |
| 1 | 0 | 0 | Rician, K = 10 dB | RICE, K = 10 dB, fshift = 0, and Maximum Doppler frequency is 30 Hz |

FIG. 9 illustrates a channel model for leaky cable in tunnel.

It can be seen from a graph of FIG. 9 that as a moving UE (train) is away from the cable, a receive power level decreases and a propagation delay increases.

Channel Model for Signal Single Frequency Network (SFN)

A third channel model is a channel model devised for a signal single frequency network (SFN) scenario and is a time-variant channel model of two taps. Each tap is characterized to be given Doppler shift, tap delay, and relative power.

The two taps mean that a signal transmitted from a transmitting end moves to a receiving end through two paths.

Since the receiving end receives the signal moving along the two paths, frequency selective fading may occur in an environment of the two taps.

Doppler shift for each of the two paths may be defined as in the following Equations 6 and 7, respectively.

$$f_{s,1}(t) = f_s\left(t + \frac{1.5D_s}{v}\right) \quad \text{[Equation 6]}$$

$$f_{s,2}(t) = f_s\left(t + \frac{0.5D_s}{v}\right) \quad \text{[Equation 7]}$$

In the above Equations 6 and 7, a definition of $f_s(t)$ is the same as the definition of the above Equation 2 to 5.

The relative power for each of the two paths may be defined as in the following Equations 8 and 9, respectively.

$$p_1(t) = \begin{cases} \dfrac{(vt)^2 + D_{min}^2}{(D_s - vt)^2 + (vt)^2 + 2D_{min}^2}, & 0 < t \le D_s/v \\ \dfrac{(2D_s - vt)^2 + D_{min}^2}{(D_s - vt)^2 + (2D_s - vt)^2 + 2D_{min}^2}, & D_s/v < t \le 2D_s/v \\ p_1(t \bmod (2D_s/v)), & t > 2D_s/v \end{cases} \quad \text{[Equation 8]}$$

$$p_2(t) = p_1(t + D_s/v) \quad \text{[Equation 9]}$$

The tap delay for each of the two paths may be defined as in the following Equations 10 and 11, respectively.

$$d_1(t) = \begin{cases} \dfrac{\sqrt{(D_s - vt)^2 + D_{min}^2}}{c}, & 0 < t \leq 2D_s/v \\ d_1(t \bmod (2D_s/v)), & t > 2D_s/v \end{cases} \quad \text{[Equation 10]}$$

$$d_2(t) = d_1(t + D_s/v) \quad \text{[Equation 11]}$$

The following Table 7 represents parameters of the SFN channel model.

TABLE 7

| Parameter | Value |
|---|---|
| $D_s$ | 1000 m |
| $D_{min}$ | 10 m |
| $v$ | 350 km/h |
| $f_d$ | 875 Hz |

$D_s$ is a distance between the adjacent base stations, and $D_{min}$ is the minimum distance between the base station and the UE (e.g., train).

In addition, v is the moving velocity of the UE (e.g., train), and $f_d$ is the maximum Doppler frequency.

FIG. 10 illustrates an example of channel characteristics of the channel model for signal single frequency network.

A graph of FIG. 10(a) shows changes in Doppler shift depending on changes in time for each path (path 1 and path 2).

In the graph of FIG. 10(a), Doppler shift values of the path 1 and the path 2 entirely show an opposite change pattern that when the Doppler shift value in the path 1 has a maximum value, the Doppler shift value in the path 2 has a minimum value, except a time at which the Doppler shift values of the path 1 and the path 2 are equal.

A graph of FIG. 10(b) shows changes in relative power depending on changes in time for each path (path 1 and path 2).

In the graph of FIG. 10(b), relative power values of the path 1 and the path 2 entirely show an opposite change pattern that when the relative power value in the path 1 has a maximum value, the relative power value in the path 2 has a minimum value, except a time at which the relative power values of the path 1 and the path 2 are equal.

A graph of FIG. 10(c) shows changes in tap delay depending on changes in time for each path (path 1 and path 2).

In the graph of FIG. 10(c), tap delay values of the path 1 and the path 2 entirely show an opposite change pattern that when the tap delay value in the path 1 has a maximum value, the tap delay value in the path 2 has a minimum value, except a time at which the tap delay values of the path 1 and the path 2 are equal.

As a result, it can be seen that the Doppler shift values, the tap delay values, and the relative power values in the SFN channel model have channel characteristics of the opposite change pattern according to the path.

Beam Related Mechanism

The present disclosure provides a method of using information on a transmission beam of the base station.

Before describing the method, a beam related operation is simply described below to increase an understanding of the method described in the present disclosure.

The base station may indirectly send the UE information about a transmission/reception beam applied to transmission/reception of a data channel (e.g., physical downlink shared channel (PDSCH)) and/or a control channel (e.g., physical downlink control channel (PDCCH)).

In this instance, the base station uses a quasi co-location (QCL) relationship with a specific reference signal (RS).

The QCL relationship means a relationship that characteristics of a channel on which a symbol on one antenna port is carried can be inferred from a channel on which a symbol on other antenna port is transmitted.

The QCL relationship may be sent to the UE from the base station via a higher layer parameter 'TCI-State'.

That is, the parameter 'TCI-State' includes information related to the QCL relationship, and the base station transmits the parameter 'TCI-State' to the UE The following Table 8 represents an example of configuration of the higher layer parameter 'TCI-State'.

TABLE 8

```
-- ASN1START
-- TAG-TCI-STATE-START
TCI-State ::=   SEQUENCE {
    tci-StateId     TCI-StateId,
    qcl-Type1       QCL-Info,
    qcl-Type2       QCL-Info            OPTIONAL,       -- Need R
    nrofPTRS-Ports ENUMERATED (n1, n2) OPTIONAL, -- Need R
    . . .
}
QCL-Info ::=    SEQUENCE {
    -- The carrier which the RS is located in. If the field is absent, it applies
to the serving cell in which the TCI-State is configured
    cell    ServCellIndex                           OPTIONAL, -- Need R
    -- The DL BWP which the RS is located in.
    bwp-Id BWP-Id OPTIONAL, -- Cond CSI-RS-Indicated
    -- Cond NZP-CSI-RS-Indicated: mandatory if csi-rs or csi-RS-for-
tracking is included, absent otherwise
    referenceSignal CHOICE {
    csi-rs3 NZP-CSI-AS-ResourceId,
    ssb SSB-Index,
    -- A set of CSI-RS resources for tracking
    csi-RS-for-tracking NZP-CSI-RS-ResourceSetId
    },
    qcl-Type        ENUMERATED {typeA, typeB, typeC, typeD},
    . . .
}
```

Among parameters included in the TCI-State represented in the above Table 8, at least one of NZP-CSI-RS-ResourceId, SSB-Index, and NZP-CSI-RS-ResourceSetId that are expressed as "referenceSignal" may correspond to a specific transmission beam of the base station.

The base station transmits the TCI-State by including the parameter in the TCI-State and thus can indirectly inform the UE of the transmission beam.

There are two methods in which the base station configures (transmits) the TCI-State applied upon the data channel transmission to the UE.

A first method is a method for configuring a TCI state to the UE when a transmission configuration indication (TCI) field is defined within downlink control information (DCI).

In the first method, a specific TCI-state may be dynamically configured to the UE through the corresponding DCI field.

In this instance, whether to define the corresponding field within downlink control information may be configured by higher layer parameter 'TCI-PresentInDCI'.

The TCI field is defined within DCI, but a MAC control element (CE) activation command shall be transmitted to the UE via higher layer signaling in order to dynamically indicate the specific TCI state to the UE.

The MAC CE activation command selects up to eight TCI states among several TCI states configured to the UE.

Configuring the dynamic TCI state to the UE means that the TCI state configured to the UE can continuously change.

Until before there is MAC CE activation command, the UE may assume that the QCL relationship is established with respect to five parameters of SSB (SS/PBCH block) and delay spread determined in an initial access procedure, Doppler spread, Doppler shift, average delay, and spatial RX.

Herein, the fact that the QCL relationship is established with respect to the five parameters may be interpreted as the meaning that a transmission beam used in the SSB transmission is the same as a transmission beam used in the data channel transmission.

A second method is a method for configuring the TCI state to the UE when a TCI field is not defined within downlink control information.

In the second method, the UE may assume that a TCI state (first TCI state) applied upon the data channel transmission is the same as a TCI state (second TCI state) applied to a control resource set (CORESET) used in the control channel transmission scheduling the data channel.

That is, the UE may assume that the first TCI state is the same as the second TCI state.

In the two methods, the first method is that the base station can dynamically send the UE the TCI state of the data channel.

On the other hand, the second method is characterized in that the base station can semi-statically send the UE the TCI state of the data channel.

There are two methods in which the base station configures (transmits) the TCI-State applied upon the control channel transmission to the UE.

A first method is a method in which the base station configures two or more TCI state candidates to the UE via higher layer parameter "TCI-StatesPDCCH".

And, the base station may configure, to the UE, a specific TCI state of the TCI state candidates through a MAC CE activation command.

When the UE does not receive the MAC CE activation command, the UE may assume that the QCL relationship is established with respect to five parameters of SS/PBCH block and delay spread determined in an initial access procedure, Doppler spread, Doppler shift, average delay, and spatial RX.

In this instance, the fact that the QCL relationship is established with respect to the five parameters may be interpreted as the meaning that a transmission beam used in the SSB transmission is the same as a transmission beam used in the control channel transmission.

A second method is a method in which the base station configures one TCI state to the UE via higher layer parameter "TCI-StatesPDCCH".

In this instance, the UE may assume that the corresponding TCI state has been applied to the control channel transmission.

Antenna Port Mapping

The present disclosure provides a method in which the different numbers of demodulation reference signal (DM-RS) ports can correspond to the same number of data streams.

Before describing the method, an antenna port mapping related operation is simply described below to increase an understanding of the method described in the present disclosure.

Upon the antenna port mapping, it is assumed that the number of data streams (the number of layers) is the same as the number of DM-RS ports.

For example, if the number of data streams is 2, the number of DM-RS ports corresponding to this may be 2.

Periodicity and Slot Offset of CSI-RS

The present disclosure provides a method for using a transmission periodicity and/or a slot offset of a reference signal (e.g., Channel State Information-Reference Signal (CSI-RS), etc.)

Before describing the method, a method of configuring the transmission periodicity and the slot offset of the CSI-RS is simply described below to increase an understanding of the method described in the present disclosure.

The following Tables 9 to 12 represent examples of configuration of a higher layer parameter configured to configure characteristics of the reference signal.

TABLE 9

```
-- TAG-TCI-STATE-STOP
-- ASN1STOP
-- ASN1START
-- TAG-CSI-RESOURCECONFIG-START
-- One CSI resource configuration comprising of one or more resource sets
CSI-ResourceConfig ::=    SEQUENCE {
    -- Used in CSI-ReportConfig to refer to an instance of CSI-ResourceConfig
    csi-ResourceConfigId      CSI-ResourceConfigId,
    -- Contains up to maxNrofNZP-CSI-RS-ResourceSetsPerConfig resource sets if
ResourceConfigType is 'aperiodic' and 1 otherwise.
    -- Corresponds to L1 parameter 'ResourceSetConfigList' ( see 38.214, section 5.2.1.3.1)
    csi-RS-ResourceSetList      CHOICE {
    nzp-CSI-RS-SSB SEQUENCE {
    nzp-CSI-RS-ResourceSetList SEQUENCE ( SIZE (1..maxNrofNZP-CSI-RS-ResourceSetsPerConfig)) OF
NZP-CSI-RS-ResourceSetId OPTIONAL,
        -- List of SSB resources used for beam measurement and reporting in a resource set
        -- Corresponds to L1 parameter 'resource-config-SS-list' (see 38,214, section FFS_Section)
        csi-SSB-ResourceSetList SEQUENCE (SIZE (1..maxNrofCSI-SSB-ResourceSetsPerConfig)) OF CSI-
SSB-ResourceSetId    OPTIONAL
        },
        csi-IM-ResourceSetList SEQUENCE (SIZE (1..maxNrofCSI-IM-ResourceSetsPerConfig) ) OF CSI-IM-
RescurceSetId
        },
```

TABLE 9-continued

```
    -- The DL BWP which the CSI-RS associated with this CSI-ResourceConfig are located in.
    -- Corresponds to L1 parameter 'BWP-Info' (see 38.214, section 5.2.1.2
    bwg-Id BWP-Id,
    -- Time domain behavior of resource configuration. Corresponds to L1 parameter
'ResourceConfigType' (see 38.214, section 5.2.2.3.5)
    resourceType    ENUMERATED { aperiodic, semiPersistent, periodic },
    . . .
-- TAG-CSI-RESOURCECONFIGTOADDMOD-STOP
-- ANSISTOP
```

TABLE 10

```
-- ASN1START
-- TAG-NZP-CSI-DS-RESOURCESET-START
NZP-CSI-RS-ResourceSet ::=       SEQUENCE {
    nzp-CSI-ResourceSetId     NZP-CSI-RS-ResourceSetId,
    -- NZP-CSI-RS-Resources assocaited with this NZP-CSI-RS resource set.
    -- Corresponds to L1 parameter 'CSI-RS-ResourceConfigList' (see 38.214, section 5.2)
    -- For CSI, there are at most 8 NZP CSI RS resources per resource set
    nzp-CSI-RS-Resources      SEQUENCE (SIZE (1..maxNrofNZP-CSI-RS-ResourcePerSet)) OF NZP-CSI-
RS-ResourceId,
    -- Indicates whether repetition is on/off. If set to set to 'OFF', the UE may not assume
that the
    -- NZP-CSI-RS resources within the resource set are transmitted with the same downlink
spatial domain transmission filter
    -- and with same NrofPorts in every symbol.
    -- Corresponda to L1 parameter 'CSI-RS-ResourceRep' (see 38.214, sections 5.2.2.3.1 and
5.1.6.1.2)
    -- Can only be configured for CSI-RS resource sets which are associated with CSI-
ReportConfig with report of L1 RSRP or "no report"
    repetition ENUMERATED { on, off }   OPTIONAL.
    -- Offset X between the slot containing the DCI that triggers a set of aperiodic NZP CSI-
RS resources and the slot in which the
    -- CSI-RS resource set is transmitted. When the field is absent the UE applies the value 0.
-- Corresponds to L1 parameter 'Aperiodic-NZP-CSI-RS-TriggeringOffset' (see 38, 214,
section FFS_Section)
    aperiodicTriggeringOffset        INTEGER (0..4)       OPTIONAL,      -- Need S
    -- Indicates that the antenna port for all NZP-CSI-RS resources in the CSI-RS resource set
is same.
    -- Corresponds to L1 parameter 'TRS-Info' (see 38.214, section 5.2.2.3.1)
    trs-Info    ENUMERATED (true)       OPTIONAL,
    . . .
}
-- TAG-NZP-CSI-RS-RESOURCESET-STOP
-- ASN1STOP
```

TABLE 11

```
-- ASN1START
-- TAG-NZP-CSI-RS-RESOURCE-START
NZD-CSI-RS-Resource ::=    SEQUENCE {
    nzp-CSI-RS-ResourceId    NZP-CSI-RS-ResourceId,
    -- OFDM symbol location (s) in a slot and subcarrier occupancy in a PRB of the CSI-RS
resource
    resourceMapping CSI-RS-ResourceMapping,
    -- Power offset of NZP CSI-RS RE to PDSCH RE. Value in dB. Corresponds to L1 parameter Pc
(see 38.214, sections 5.2.2.3. 1 and 4.1)
    powerControlOffset    INTEGER (-8..15);
    -- Power offset of NZP CSI-RS RE to SS RE. Valse in dB. Corresponds to L1 parameter
'Pc_SS' (see 38.214, section 5.2.2.3.1)
    powerControlOffsetSS     ENUMERATED{db-3, db0, db3, db6} OPTIONAL,
    -- Scrambling ID (see 38.214, section 5.2.2.3.1)
    scramblingID     ScramblingId,
    -- Periodicity and slot offset s11 corresponds to a periodicity of 1 slot, s12 to a
periodicity of two slots, and so on.
    -- The corresponding offset is also given in number of slots. Corresponds to L1 parameter
'CSI-RS-timeConfig' (see 38.214, section 5.2.2.3.1)
    periodicityAndOffset      CSI-ResourcePeriodicityAndOffset OPTIONAL,    -- Cond
PeriodicOrSemiPersistent
```

TABLE 11-continued

-- For a target periodic CSI-RS, contains a reference to one TCI-State in TCI-States for
providing the QCL source and
    -- QCL type. For periodic CSI-RS, the source can be SSB or another periodic-CSI-RS.
    -- Corresponde to L1 parameter 'QCL-Info-PeriodicCSI-RS' (see 38.214, section 5.2.2.3.1)
    qcl-InfoPeriodicCSI-RS TCI-StateId OPTIONAL, -- Cond Periodic
    ...
}
-- TAG-NZP-CSI-RS-RESOURCE-STOP
-- ASN1STOP

TABLE 12

```
-- ASN1START
-- TAG-CSI-RESOURCEPERIODICITYANDOFFSET-START
CSI-ResourcePeriodicityAndOffset ::=    CHOICE {
    slots4      INTEGER (0 .. 3),
    slots5      INTEGER (0 .. 4),
    slots8      INTEGER (0 .. 7),
    slots10     INTEGER (0 .. 9),
    slots16     INTEGER (0 .. 15),
    slots20     INTEGER (0 .. 19),
    slots32     INTEGER (0 .. 31),
    slots40     INTEGER (0 .. 39),
    slots64     INTEGER (0 .. 63),
    slots80       INTEGER (0 .. 79),
    slots160      INTEGER (0 .. 159),
    slots320      INTEGER (0 .. 319),
    slots640      INTEGER (0 .. 639),
}
-- TAG-CSI-RESIYRCEPERIODICITYANDOFFSET-STOP
-- ASN1STOP
```

From the above Tables 9 to 12, a layer structure between the higher layer parameters can be confirmed.

CSI resources may be configured via a parameter 'CSI-ResourceConfig' of Table 9.

In this instance, the CSI resource may include one or more resource sets.

The resource set may also include one or more resources.

The periodicity of the resource may be configured as one value of three parameters included in a parameter 'resourceType' among parameters included in the parameter 'CSI-ResourceConfig'.

More specifically, the parameter 'resourceType' includes a parameter 'aperiodic', a parameter 'semiPersistent', and a parameter 'periodic'.

If the resource has characteristic of 'semiPersistent' or 'periodic', periodicity and slot offset values of the resource may be configured through a value of a parameter 'periodicityAndOffset' among parameters included in a parameter 'NZP-CSI-RS-Resource' of Table 11 capable of configuring characteristics of the resource.

3GPP 5G NR standard technologies for helping understanding of the methods provided by the present disclosure have been described above.

The methods provided by the present disclosure are described in detail below.

In the SFN scenario of the high speed train scenario, Doppler spread and delay spread have time-variant characteristics.

FIG. 11 illustrates an example of time-variant characteristics of Doppler spread and delay spread in the SFN scenario for parameters of the above Table 9.

Time-variant characteristics of the channel illustrated in an example of FIG. 11 may be classified into the following four states depending on a magnitude of Doppler spread and a magnitude of delay spread.

State 1: low Doppler spread and low delay spread
State 2: low Doppler spread and high delay spread
State 3: high Doppler spread and high delay spread
State 4: high Doppler spread and low delay spread In the present disclosure, the state 1 to the state 4 are hereinafter used as the same meaning as the above.

FIG. 12 illustrates an example of time-variant characteristics of channel depending on a moving section of a UE (e.g., train).

If channel characteristics such as Doppler spread and delay spread vary, a pattern, etc. of a reference signal suitable for each channel characteristic may vary.

For example, as illustrated in FIG. 12, the state 1 (1201) in which both the Doppler spread and the delay spread are low may use a reference signal pattern in which a time/frequency densities are low, as a pattern of demodulation reference signal (DM-RS).

That is, the DM-RS does not have to be transmitted frequently because the Doppler spread is low, and the DM-RS does not have to be frequently transmitted on even resources on a frequency axis because the delay spread is low.

On the other hand, the state 2 (1202) in which the Doppler spread is low and the delay spread are high may require a DM-RS pattern in which a time density is low and a frequency density is high.

That is, the DM-RS does not have to be transmitted frequently because the Doppler spread is low, but the DM-RS needs to be frequently transmitted on resources on a frequency axis because the delay spread is high.

In addition, the state 3 (1203) in which both the Doppler spread and the delay spread are high may require a DM-RS pattern in which both time and frequency densities are high.

That is, the DM-RS has to be transmitted frequently because the Doppler spread is high, and the DM-RS needs to be frequently transmitted on resources on a frequency axis because the delay spread is high.

In addition, the state 4 (1204) in which both the Doppler spread is high and the delay spread is low may require a DM-RS pattern in which a time density is high and a frequency density is low.

That is, the DM-RS has to be transmitted frequently because the Doppler spread is high, but the DM-RS does not have to be frequently transmitted on resources on a frequency axis because the delay spread is low.

The transmission/reception of the signal in a high frequency band has signal characteristics such as high path attenuation, and thus the quality of the signal is reduced. Therefore, beamforming technology was applied to supplement this.

The use of the high frequency band may be considered for data transmission/reception of high capacity in a high speed train scenario.

For the data transmission/reception of high capacity in the high speed train scenario, a different beam may be applied depending on each section of a moving path of the UE.

In addition, in the high speed train scenario, the moving section of the UE may be divided depending on channel characteristics as in the example of FIG. 12, and a different beam may be applied to each section divided depending on the channel characteristics.

FIG. 13 illustrates an example of applying different beams depending on a moving section of a UE.

In FIG. 13, a base station 1301 transmitting a beam and a UE 1302 that is moving along a moving path are shown.

Referring to FIG. 13, channel states 1310 to 1340 may change depending on the moving path, and the base station 1301 may transmit data through a different type of beam per each channel state.

In summary, in the high speed train scenario, channel characteristics may change depending on the moving section of the UE, and thus a DM-RS pattern most suitable for the section may vary.

Further, it was confirmed that a beam supporting the UE varies depending on the moving section of the UE when applying the beamforming technology.

The present disclosure proposes a method capable of reducing an RS overhead by configuring a suitable DM-RS pattern, etc. depending on a beam supporting the UE and capable of improving a system performance by improving spectral efficiency.

More specifically, there are a method (proposal 1) for mapping a different DM-RS pattern to a different transmission beam, a method (proposal 2) for mapping a different number of DM-RS ports to a different transmission beam/transmission beam group, a method (proposal 3) for mapping a different DM-RS pattern to a transmission periodicity of a different channel state reference signal, and a method (proposal 4) for differently configuring a transmission periodicity of a channel state reference signal per resource on which a channel state reference signal is transmitted.

The proposals 1 to 4 are described in detail below.

Proposal 1: Use of Different DM-RS Patterns if Transmission Beam Applied to Data Transmission Changes According to the proposal 1, if a transmission beam applied when a base station transmits data to a UE changes, a dedicated demodulation reference signal (DM-RS) pattern may be used in each transmission beam.

For example, a first DM-RS pattern may be used if a transmission beam applied to data transmission is a first transmission beam, and a second DM-RS pattern may be used if a transmission beam applied to data transmission is a second transmission beam.

In this instance, a specific correspondence relationship may be fixedly defined between the base station and the UE so that different DM-RS patterns correspond to different beams. That is, a correspondence (mapping) relationship between these transmission beams and DM-RS patterns may be previously promised between the base station and the UE, or and may be pre-configured.

Alternatively, a specific correspondence relationship between the transmission beams and the DM-RS patterns may be configured via information (e.g., higher layer signaling and/or downlink control information (DCI)) that is transmitted and received between the base station and the UE.

When the base station transmits data, the base station may transmit information on the transmission beam to the UE to receive the corresponding data.

The information on the transmission beam may be simply referred to as 'transmission beam information'.

The transmission beam information may include a QCL relationship applied to data transmission.

The UE may receive the transmission beam information from the base station and acquire DM-RS pattern information applied to the data transmission based on the transmission beam information.

That is, the UE may recognize a beam, through which the DMRS and downlink data are transmitted, based on the transmission beam information, and may recognize (know) a mapping pattern of the DMRS mapped to the transmission beam through the above-described mapping relationship.

Next, the UE may estimate a valid channel required for data demodulation from the corresponding DM-RS pattern.

The 'data' may mean data of a data channel (e.g., PDSCH) and/or data of a control channel (e.g., PDCCH).

If the UE moves along a fixed path, a transmission beam applied upon the data transmission from the base station to the UE may vary depending on a moving path.

That is, a specific transmission beam of the base station may be connected to a specific section of a moving path of the UE.

For example, if the moving path of the UE is divided into n specific sections, the n specific sections may be identified as a moving section 1 to a moving section n.

When the base station has n transmission beams and information capable of identifying the transmission beams is referred to as a beam identifier (ID), the transmission beams of the base station may be identified as Beam ID 1 to Beam ID n.

Herein, the beam IDs and the moving sections may be mapped as follows, for example, (Beam ID 1-moving section 1) and (Beam ID 2-moving section 2).

As illustrated in FIG. 12, different channel characteristics may appear depending on the moving section of the UE Thus, as illustrated in FIG. 13, each Beam ID mapped to the specific moving section of the UE may be mapped to specific channel characteristic.

For example, state 1(1310), state 2(1320), state 3(1330), and state 4(1340) representing specific channel characteristic for each Beam ID may be mapped as illustrated in FIG. 13: (Beam ID 1-state 1), (Beam ID 2-state 2), (Beam ID 3-state 3), (Beam ID 4-state 4).

Further, the suitable DM-RS pattern may vary depending on channel characteristics.

FIG. 14 illustrates four cases of different DM-RS patterns assigned on the time/frequency resource.

In FIG. 14, a horizontal axis of the table on which the DM-RS patterns appear corresponds to a time axis, and a vertical axis corresponds to a frequency axis.

In FIG. 14($a$), a DM-RS pattern P1, in which intervals between the DM-RSs in both the time axis and the frequency axis are wide, corresponds to a DM-RS pattern in which both a time density and a frequency density are low.

The DM-RS pattern described above is suitable for a case where both Doppler spread and delay spread are low.

In FIG. 14($b$), a DM-RS pattern P2, in which an interval between the DM-RSs in the time axis is wide and an interval between the DM-RSs in the frequency axis is narrow, corresponds to a DM-RS pattern in which a time density is low and a frequency density is high.

The DM-RS pattern described above is suitable for a case where Doppler spread is low and delay spread is high.

In FIG. 14($c$), a DM-RS pattern P3, in which intervals between the DM-RSs in both the time axis and the frequency axis are narrow, corresponds to a DM-RS pattern in which both a time density and a frequency density are high.

The DM-RS pattern described above is suitable for a case where both Doppler spread and delay spread are high.

In FIG. 14(d), a DM-RS pattern P4, in which an interval between the DM-RSs in the time axis is narrow and an interval between the DM-RSs in the frequency axis is wide, corresponds to a DM-RS pattern in which a time density is high and a frequency density is low.

The DM-RS pattern described above is suitable for a case where Doppler spread is high and delay spread is low.

Such a mapping pattern of DM-RSs may be formed by combining Type 1 and Type 2 of DMRSs and the number of additional DM-RSs in wireless mobile communication.

For example, a mapping type of DM-RSs may be formed in a structure in which the number of additional DM-RSs is mapped to a predetermined number of specific symbols in Type 1.

The mapping type of DM-RSs may be formed through various methods, and may be formed by a combination of types of DM-RSs of a mobile communication UE and symbols to which additional DM-RSs are mapped.

Referring again to FIG. 12, in the state 1 in which both the Doppler spread and the delay spread are low, the DM-RS pattern P1 in which both the time density and the frequency density are low may be used as a suitable pattern of DM-RSs.

On the other hand, in the state 2 in which the Doppler spread is low and the delay spread is high, the DM-RS pattern P2 in which the time density is low and the frequency density is high may be used.

Further, in the state 4 in which the Doppler spread is high and the delay spread is low, the DM-RS pattern P4 in which the time density is high and the frequency density is low may be used.

Further, in the state 3 in which both the Doppler spread and the delay spread are high, the DM-RS pattern P3 in which both the time density and the frequency density are high may be used.

When the most suitable DM-RS pattern is used according to the channel characteristics, the unnecessary RS overhead can be minimized, and thus the spectral efficiency can be improved.

Examples (P1 to P4) of the DM-RS pattern may be connected to different channel characteristics, and each channel characteristic may be connected to each Beam ID.

As a result, the different DM-RS patterns may be connected to the different Beam IDs.

For example, the following connection is possible: (Beam ID 1-P1), (Beam ID 2-P2), (Beam ID 3-P3), and (Beam ID 4-P4).

The detailed technology content for supporting a method of the proposal 1 described in the present disclosure is described in more detail below.

The base station may map a specific reference signal resource represented by 'NZP-CSI-RS-ResourceId', 'SSB-Index', 'NZP-CSI-RS-ResourceSetId', etc. to a different DM-RS pattern and configure the corresponding information to the UE via the higher layer signaling.

The specific reference signal resource may correspond to a transmission beam of the base station.

That is, an identifier for identifying a resource on which a specific reference signal is transmitted may correspond to a transmission beam through which the specific reference signal is transmitted, and the transmission beam may correspond to a mapping pattern of the DMRS.

Thus, if the UE can know an identifier for the specific reference signal, the UE can know a transmission beam for the identifier and a mapping pattern corresponding to the transmission beam.

The base station may send the UE a quasi co-location (QCL) relationship between data upon the data transmission and the specific reference signal resource.

The 'data' may mean data of a data channel and/or data of a control channel, and the 'DM-RS pattern' may mean a DM-RS pattern for data demodulation of the data channel and/or a DM-RS pattern for data demodulation of the control channel.

The data of the control channel may be downlink control information (DCI).

The base station may indirectly indicate, to the UE, the transmission beam applied to the data transmission using the QCL relationship, and may also indicate, to the UE, DM-RS pattern information applied to the data transmission.

In order for the base station to indicate the QCL relationship to the UE, a method described in the above 'Beam related mechanism in 3GPP 5G NR standard' may be applied.

The UE may feedback a CSI-RS resource indicator (CRI) and/or a SSB resource indicator (SSBRI) to the base station, in order to indicate a beam preferred by the UE.

The corresponding CRI and/or the SSBRI may correspond to a specific DM-RS pattern preferred by the UE.

A method in which the base station indicates a different DM-RS pattern to the UE roughly includes two methods.

A first method is a method in which the base station pre-configures mapping information between a specific reference signal resource and a DM-RS pattern to the UE and sends the UE transmission beam information including a QCL relationship with the specific reference signal resource.

A second method is a method in which the base station can transmit, to the UE, transmission beam information by further including a pattern ID representing a specific reference signal resource and a DM-RS pattern in the transmission beam information including a QCL relationship with the specific reference signal resource, and the UE can explicitly recognize a mapping pattern of DMRSs through the pattern ID.

First, the first method is described.

The following Table 13 shows an example of a higher layer parameter 'Dmrs-Mapping-Information' configured by mapping a specific reference signal resource to a different DM-RS pattern.

TABLE 13

```
Dmrs-Mapping-Information ::=      SEQUENCE {
   dmrs-mapping-informationId     Dmrs-Mapping-Information
   referenceSiganl CHOICE {
   csi-rs NZP-CSI-RS-ResourceId,
   ssb SSB-Index,
   csi-RS-for-tracking NZP-CSI-AS-ResourceSetId
   },
   dmrs-pattern      Dmrs-PatternId,
   ...
}
Dmrs-Pattern ::=         SEQUENCE {
   dmrs-patternId        Dmrs-PatternId,
   dmrs-pattern          ENUMERATED { p1, p2, p3, p4 },
   ...
}
```

If the base station indicates the DM-RS pattern to the UE through the QCL relationship with the specific reference signal resource based on the first method, the base station may separate a DM-RS pattern of a data channel from a DM-RS pattern of a control channel and indicate the DM-RS pattern to the UE.

Specifically, the DM-RS pattern of the data channel may be configured according to a QCL relationship configured to the data channel, and the DM-RS pattern of the control channel may be configured according to a QCL relationship configured to the control channel.

That is, the DM-RS pattern of the data channel may be determined based on a QCL relationship between antenna ports on which the data channel is transmitted, and the DM-RS pattern of the control channel may be determined based on a QCL relationship between antenna ports on which the control channel is transmitted.

In this instance, the DM-RS pattern used in the transmission of the data channel may be different from the DM-RS pattern used in the transmission of the control channel.

The base station may indicate the DM-RS pattern to the UE without separating a DM-RS pattern of a data channel from a DM-RS pattern of a control channel.

Specifically, the DM-RS pattern of the data channel may be configured according to a QCL relationship configured to the control channel.

That is, the DM-RS pattern of the control channel may be determined based on a QCL relationship between antenna ports on which the control channel is transmitted, and the DM-RS pattern of the data channel may be determined based on the QCL relationship between the antenna ports on which the control channel is transmitted.

In this instance, the DM-RS pattern used in the transmission of the data channel may be the same as the DM-RS pattern used in the transmission of the control channel.

That is, if a channel state of the data channel for transmitting downlink data is the same as or similar to a channel state of the control channel for transmitting control information, mapping patterns of the DM-RSs used in the data channel and the control channel may be the same as or similar to each other.

If the DM-RS pattern of the data channel and the DM-RS pattern of the control channel are separated and indicated, there is an effect that the DM-RS pattern can be configured dynamically.

On the other hand, if the DM-RS pattern of the data channel is indicated according to the QCL relationship configured to the control channel, there is an effect that the DM-RS pattern is semi-statically configured and thus a signaling overhead can be reduced.

The first method can indirectly indicate the DM-RS pattern to the UE by sending the UE the QCL relationship with the specific reference signal resource.

Specifically, the QCL relationship may be sent to the UE through the TCI state. That is, since each TCI state includes the QCL relationship with the specific reference signal resource, the QCL relationship may be sent to the UE through this.

First, the UE may be pre-configured with higher layer parameter 'Dmrs-Mapping-Information' illustrated in the above Table 13, and may previously know information related to a correspondence (mapping) relationship between a specific transmission beam and a specific DM-RS pattern.

The information related to the correspondence (mapping) relationship between the specific transmission beam and the specific DM-RS pattern may be simply referred to as 'first correspondence (mapping) information'.

The first correspondence (mapping) information may be included in system information.

Next, the UE may be configured, from the base station, with higher layer parameter 'TCI-state' including information related to the QCL relationship.

The information related to the QCL relationship may be included in 'transmission beam information' and may be transmitted to the UE.

The UE may indirectly know a transmission beam (first transmission beam) applied to data transmission based on the QCL relationship.

The UE may know a relationship between the first transmission beam, that is known through the QCL relationship, and the specific DM-RS pattern based on the pre-configured first correspondence (mapping) information.

That is, the base station does not directly inform the UE of the DM-RS pattern, and the UE can acquire the DM-RS pattern based on the first correspondence (mapping) information and the QCL relationship.

Through the above method, the UE may be indirectly indicated with the DM-RS pattern from the base station.

The second method is described below.

The base station may transmit, to the UE, the transmission beam information by further including mapping information between the specific reference signal resource and the DM-RS pattern in the transmission beam information including the QCL relationship with the specific reference signal resource.

That is, the base station may add DM-RS pattern information to the higher layer parameter 'TCI-State' and explicitly indicate the DM-RS pattern to the UE.

The following Tables 14 and 15 show an example of the higher layer parameter 'TCI-state' to which the DM-RS pattern information is added.

TABLE 14

```
TCI-State ::=   SEQUENCE {
   tci-StateId    TCI-StateId,
   qcl-type1      QCL-Info,
   qcl-type2      QCL-Info       OPTIONAL,   -- Need R
   nrofPTRS-Ports ENUMERATED {n1, n2} OPTIONAL, -- Need R
   dmrs-pattern   Dmrs-PatternId,
   ...
}
```

It can be seen from the Table 14 that not only a parameter related to the QCL relationship but also a parameter 'dmrs-pattern' indicating the DM-RS pattern have been added to the TCI-State.

TABLE 15

```
TCI-State ::= SEQUENCE {
   tci-StateId   TCI-StateId,
   qcl-Type1     QCL-Info,
   qcl-Type2     QCL-Info OPTIONAL,     -- Need R
   nrofPTRS-Ports ENUMERATED (n1, N2)   OPTIONAL,  -- Need R
   ...
}
QCL-Info ::=     SEQUENCE {
   -- The carrier which the RS is located in. If the field is absent, it
applies to the serving cell in which the TCI-State is configured
   cell   ServCellIndex    OPTIONAL,     -- Need R
   -- The DL BWP which the RS is located in.
   bwp-Id BWP-Id  OPTIONAL,   -- Cond CSI-RS-Indicated
   -- Cond NZP-CSI-RS-Indicated: mandatory if csi-rs or csi-RS-for-
tracking is included, absent otherwise
   referenceSignal CHOICE {
   csi-rs NZP-CSI-RS-ResourceId,
   ssb SSB-Index,
   -- A set of CSI-RS resources for tracking
   csi-RS-for-tracking NZP-CSI-RS-ResourceSetId
   },
```

TABLE 15-continued

```
qcl-Type      ENUMERATED (typeA, typeB, typeC, typeD),
dmrs-pattern  Dmrs-PatternId,
...
}
```

It can be seen from the Table 15 that not only a parameter related to the QCL relationship but also a parameter 'dmrs-pattern' indicating the DM-RS pattern have been added to the TCI-State.

A frequency density and a time density of the DM-RS may be configured to the UE via higher layer parameter 'DMRS-DownlinkConfig', but the 'DMRS-DownlinkConfig' corresponds to a parameter (i.e., UE-specific parameter) individually configured to each UE.

Thus, the base station shall configure the corresponding DM-RS pattern to each UE so that all the UEs can have the same DM-RS pattern in a section supported with a specific transmission beam.

For example, if there are n UEs, where n is a natural number equal to or greater than 2, signalling may be required n times to configure the same DM-RS pattern to the n UEs in a section supported with a specific transmission beam.

This method has a disadvantage to increase a signalling overhead that the system has.

If the higher layer parameter changes, the base station receives a signal (e.g., ACK) that the UE has well received the corresponding signal.

However, in an environment where the beam rapidly changes, a process in which the base station waits the signal may be a factor that delays the suitable change of the DM-RS pattern.

The method described in the present disclosure has an effect that based on a transmission beam changing based on a moving path of the UE that moves along a fixed moving path, the base station can provide a most suitable DM-RS pattern in a predetermined area to which the corresponding transmission beam is applied.

The method also has an effect that even if the beam rapidly changes, the UE can be supported with a suitable DM-RS pattern via information (first correspondence (mapping) information) related to a relationship between a pre-configured transmission beam and a DM-RS pattern without the delay The information (first correspondence (mapping) information) related to the relationship between the transmission beam and the DM-RS pattern may be transmitted to the UE via system information.

The system information may be master information (MIB), system information block (SIB) 1, or other system information (OSI), or the like.

The method described in the present disclosure can prevent a frequent exchange of a higher layer parameter generated for changing a DM-RS pattern of each UE and can reduce a signalling overhead that the system has.

Proposal 2: Differently Configuring the Number of DM-RS Ports for Transmission of the Same Data Stream in a Beam and/or a Beam Group According to the proposal 2, if a transmission beam applied to data transmission of a base station changes, the number of DM-RS antenna ports for transmission of the same data stream may be differently configured in each beam and/or beam group consisting of two or more beams.

In this instance, a specific correspondence relationship may be fixedly defined between the base station and a UE so that different numbers of DM-RS antenna ports correspond to different beams and/or different beam groups.

That is, a correspondence (mapping) relationship of the transmission beam and the number of DM-RS antenna ports may be previously promised between the base station and the UE, or may be pre-configured.

Alternatively, a specific correspondence relationship (second correspondence (mapping) information) between the transmission beam and/or the beam group and the number of DM-RS antennas may be configured via information exchange (e.g., higher layer signaling and/or downlink control information (DCI)) between the base station and the UE.

When the base station transmits data, the base station may transmit information on the transmission beam to the UE to receive the corresponding data.

The information on the transmission beam may be simply referred to as 'transmission beam information'.

The transmission beam information may include a QCL relationship applied to data transmission.

The UE may receive the transmission beam information from the base station and acquire information on the number of DM-RS antenna ports applied to the data transmission based on the transmission beam information.

Next, the UE may estimate a valid channel required for data demodulation based on the corresponding number of DM-RS antenna ports.

The 'data' may mean data of a data channel (e.g., PDSCH) and/or data of a control channel (e.g., PDCCH).

In the example of FIG. 12, it can be seen that in the state 2 (1202) and the state 3 (1203), delay spread of the channel increases.

This is because a difference in tap delay of each path increases due to a distance difference from each remote radio head (RRH) to the UE.

The RRH may be NR Tx/Rx point (TRP), or the RRH may mean an antenna connected to one base station or an antenna far away from one base station.

The RRH may not mean only one base station.

If a difference in tap delay of each path increases, it may be preferable that each RRH is configured with a different DM-RS port.

That is, if channels of paths are separated and estimated, delay spread of each of the separated paths may appear as a small value since a difference of tap delay in each path is not large.

Thus, unlike the method of the proposal 1, a channel estimation performance can be improved through the method of differently configuring the number of DM-RS antenna ports for transmission of the same data stream depending on the beam or the beam group.

FIG. 15 illustrates an example where beams supported by two RRHs correspond to each other in a specific section with a different channel characteristic on a moving path of a UE.

In FIG. 15, RRH1 1510 transmits different four beams 1-1 to 1-4 (1511 to 1514) depending on channel states (1501 to 1504) of each specific section.

Further, in FIG. 15, RRH2 1520 transmits different four beams 2-1 to 2-4 (1521 to 1524) depending on the channel states (1501 to 1504) of each specific section.

In FIG. 15, the state 1 to the state 4 (1501 to 1504) have the following channel characteristics.

In FIG. 15, since the delay spread is small in a section corresponding to the state 1 supported by the beam 1-1 and the beam 1-2 and the state 4 supported by the beam 4-1 and the beam 4-2, the section may use a DM-RS pattern (e.g., P1 and P4 in FIG. 14) in which a frequency density is low.

On the other hand, since the delay spread is large in a section corresponding to the state 2 supported by the beam 2-1 and the beam 2-2 and the state 3 supported by the beam 3-1 and the beam 3-2, the section may use a DM-RS pattern (e.g., P2 and P2 in FIG. 14) in which a frequency density is high.

In this instance, orthogonal DM-RS ports may be assigned to each RRH in the section corresponding to the state 2 and the state 3.

The DM-RS pattern mapped to each DM-RS port may apply a DM-RS pattern in which a frequency density is low.

FIG. 16 illustrates an example of differently configuring the number of DM-RS antenna ports for transmission of the same data stream depending on a beam/beam group supporting a UE.

In FIG. 16, state 1 to state 4 (1601 to 1604) have the following channel characteristics.

FIG. 16(a) and FIG. 16(d) illustrate an example of supporting the UE with the same DM-RS antenna port (DM-RS port 1) at each RRH.

In each section in which the UE is supported with the same DM-RS antenna port, the channel corresponds to the state 1 and the state 4 and corresponds to a channel in which delay spread is low.

FIG. 16(b) and FIG. 16(c) illustrate an example of supporting the UE with a different DM-RS antenna port at each RRH.

That is, RRH1 supports the UE with DM-RS port 1, and RRH2 supports the UE with DM-RS port 2.

In a specific section of FIG. 16, if the UE is supported with the same DM-RS antenna port at different RRHs, the channel corresponds to the state 2 and the state 3 and corresponds to a channel in which delay spread is high.

However, since the UE is supported with a different DM-RS antenna port at each RRH, it can be expected that delay spread of the channel detected at each DM-RS antenna port is not high.

FIG. 17 illustrates an example of a DM-RS pattern capable of corresponding to each specific section of FIG. 16.

In FIG. 17, DM-RS patterns P1, P2, P3, and P4 may be applied as DM-RS patterns for supporting moving sections corresponding to the state 1, the state 2, the state 3, and the state 4 in FIG. 16, respectively.

That is, the following correspondence relationship is satisfied: (P1-state 1), (P2-state 2), (P3-state 3), and (P4-state 4).

In FIG. 17, since the state 2 and the state 3 correspond to a channel in which delay spread is high, it is necessary for the UE to be supported with a DM-RS pattern in which a frequency density is high.

Through a method of the proposal 2, on the channel such as the state 2 and the state 3, in which delay spread is high, the RRH can support a DM-RS pattern, in which a frequency density is high, by changing the number of DM-RS antenna ports, instead of supporting a DM-RS pattern, in which a frequency density is high, through changes of the DM-RS pattern.

More specifically, FIG. 17(b) and FIG. 17(c) illustrate that there is an effect of increasing a frequency density of the DM-RS pattern by changing the number of DM-RS antenna ports for the transmission of the same data stream in the state 2 and the state 3 in which delay spread is high.

As a result, channel characteristics between the base station and the UE may vary depending on a moving section of the UE, and hence a DM-RS pattern, in which a frequency density is high, can be supported by differently configuring the number of DM-RS antenna ports for the transmission of the same data stream, without changing the DM-RS pattern.

The detailed technology content for supporting the method of the proposal 2 described in the present disclosure is described in more detail below.

The base station may differently configure the number of DM-RS antenna ports transmitting data streams even if the number of data streams is the same.

That is, the base station may configure two or more DM-RS antenna ports for transmission of one data stream in a specific combination consisting of two or more resources of specific reference signal resources represented by 'NZP-CSI-RS-ResourceId', 'SSB-Index', 'NZP-CSI-RS-ResourceSetId', etc.

The specific reference signal resource may correspond to a transmission beam of the base station.

Hereinafter, a method of 'configuring two or more DM-RS antenna ports for transmission of one data stream' is defined as a single frequency network (SFN).

The base station may map the specific combination consisting of two or more resources and whether to perform a SFN operation, and configure the corresponding information to the UE via the higher layer signaling.

The base station may send the UE a quasi co-location (QCL) relationship between data upon the data transmission and the specific reference signal resource.

The base station may indirectly indicate, to the UE, the transmission beam applied to the data transmission using the QCL relationship, and may also indicate, to the UE, whether to apply the SFN method for the data transmission.

Applying the SFN method may mean that the same data stream is transmitted from different DM-RS antenna ports.

In order for the base station to indicate the QCL relationship to the UE, a method described in the above 'Beam related mechanism in 3GPP 5G NR standard' may be applied.

The 'data' may mean data of a data channel and/or data of a control channel.

As a method for the base station to indicate the UE that the SFN method has been applied, two methods may be used.

A first method is a method for the base station to send the UE a higher layer parameter mapping a specific combination consisting of two or more resources and whether to perform a SFN operation.

A second method is a method for the base station to send the UE a higher layer parameter 'TCI-state' by including a parameter explicitly indicating whether to apply the SFN in the higher layer parameter 'TCI-state'.

First, the first method is described.

The following Table 16 shows an example of a higher layer parameter 'SFN-Mapping-Information' configured by mapping a specific combination consisting of two or more resources and whether to perform a SFN operation.

TABLE 16

SFN-Mapping-Informatica ::= SEQUENCE {
  sfn-mapping-informationId     SFN-Mapping-InformationId,
  referenceSignall     CHOICE {
  csi-rs NZP-CSI-RS-ResourceId,
  ssb SSB-Index,
  csi-RS-for-tracking NZP-CSI-RS-ResourceSetId
  }, TABLE 16-continued

```
referenceSignal2    CHOICE {
csi-rs    NZP-CSI-RS-ResourceSetId,
ssb SSB-Index
csi-RS-for-tracking NZP-CSI-RS-ResourceSetId
},
...
}
```

Based on the configuration of the parameter 'SFN-Mapping-Information', if both referenceSignal1 and referenceSignal2 are included in the QCL relationship configured for data transmission, the UE may assume that the SFN method has been applied.

That is, in this case, the same data stream may be transmitted through a plurality of DM-RS antenna ports.

On the contrary, if both referenceSignal1 and referenceSignal2 are not included in the QCL relationship configured for data transmission, the UE may assume that a spatial multiplexing (SM) method has been applied.

That is, in this case, the same data stream may be transmitted through one DM-RS antenna port.

The first method can indirectly indicate, to the UE, whether to apply the SFN method by sending the UE the QCL relationship with the specific reference signal resource.

Specifically, the QCL relationship may be sent to the UE through the TCI state. That is, since each TCI state includes the QCL relationship with the specific reference signal resource, the QCL relationship may be sent to the UE through this.

First, the UE may be pre-configured with higher layer parameter 'SFN-Mapping-Information' illustrated in the above Table 16, and may know information related to mapping of a specific combination consisting of two or more resources and whether to perform a SFN operation.

The information related to the mapping of the specific combination consisting of two or more resources and whether to perform the SFN operation may be simply referred to as 'second correspondence (mapping) information'.

Next, the UE may be configured, from the base station, with the parameter 'TCI-state' including the QCL relationship.

The QCL relationship may include both 'referenceSignal1' and 'referenceSignal2'.

The UE can indirectly know whether to apply the SFN method based on the QCL relationship.

That is, the base station does not directly inform the UE about whether to apply the SFN method, and the UE determines if both the 'referenceSignal1' and the 'referenceSignal2' are included based on the QCL relationship, and can indirectly know whether to apply the SFN method.

Through the above method, the UE may be indirectly indicated with whether to apply the SFN method from the base station.

The second method is described below.

The base station may explicitly indicate to the UE whether to perform the SFN operation by adding a parameter indicating whether to perform the SFN operation to the higher layer parameter 'TCI-state'.

The following Table 17 shows an example of the higher layer parameter 'TCI-state' to which information about whether to perform the SFN operation is added.

TABLE 17

```
TCI-State ::=    SEQUENCE{
tci-StateId TCI-StateId,
qcl-Type1    QCL-Info,
qcl-Type2    QCL-Info    OPTIONAL,    -- Need R
nrofPTRS-Ports    ENUMERATED {n1, n2} OPTIONAL, -- Need R
sfn-configuration    ENUMERATED {on, off},
...
}
```

It can be seen from the Table 17 that not only the parameter related to the QCL relationship but also a higher layer parameter 'sfn-configuration' to which information about whether to perform the SFN operation is added have been added to the 'TCI-state'.

In the first method and the second method, if two different QCL relationships for the data transmission are configured to the UE, it may be interpreted as that data transmission is performed at different RRHs or TRPs or panels.

In the related art, the data transmission has to be performed using the SM method.

On the other hand, the method described in the present disclosure may apply the SFN method for transmitting the same data stream in a situation where the stability of link is prioritized.

Because the same data is transmitted together when the SFN method is applied, there are effects of improving the stability of data reception, improving coverage, and improving the stability against deterioration of the beamforming link quality.

In particular, these effects can be of great help in performing stable data transmission/reception in the high frequency band where path attenuation is large, a transmittance is low, and diffraction characteristics are poor.

Proposal 3: Differently Configuring a Transmission Periodicity of a Reference Signal Transmitted from Each Beam if a Transmission Beam Applied to Data Transmission Changes According to the proposal 3, if a transmission beam applied when a base station transmits data to a UE changes, a transmission periodicity of a reference signal transmitted from each beam may be differently configured.

The reference signal may include a channel state information-reference signal (CSI-RS), a tracking reference signal (TRS), and the like that are transmitted to detect channel characteristics between the base station and the UE.

The reference signal may be referred to as a channel characteristic reference signal.

A transmission periodicity of the channel characteristic reference signal may be configured based on channel characteristics of the UE. The channel characteristics of the UE may include Doppler spread, Doppler shift, and the like.

A specific correspondence relationship may be fixedly defined between the base station and the UE so that transmission periodicities of different channel characteristic reference signals correspond to different DM-RS patterns.

Alternatively, a specific correspondence relationship between a transmission periodicity of a reference signal and a DM-RS pattern may be configured via information exchange (e.g., higher layer signaling and/or downlink control information (DCI)) between the base station and the UE.

That is, a correspondence (mapping) relationship between transmission periodicities of different channel characteristic reference signals and DM-RS patterns may be previously promised between the base station and the UE, or may be pre-configured.

When the base station transmits data, the base station may transmit information on the transmission beam to the UE to receive the corresponding data.

The information on the transmission beam may be simply referred to as 'transmission beam information'.

The information on the transmission beam may include a transmission periodicity of a reference signal transmitted from the corresponding beam.

The reference signal may mean CSI-RS, TRS, etc. that are transmitted from the base station to the UE for acquiring channel characteristics in addition to a reference signal (e.g., DM-RS) for data demodulation.

The transmission periodicity of the reference signal may mean a transmission periodicity of the CSI-RS and the TRS.

The transmission beam information may include a QCL relationship applied to data transmission.

The UE may receive the transmission beam information from the base station and acquire DM-RS pattern information applied to the data transmission based on the transmission periodicity of the reference signal included in the corresponding transmission beam information.

The UE may estimate a valid channel required for data demodulation with the corresponding DM-RS pattern.

The 'data' may mean data of a data channel (e.g., PDSCH) and/or data of a control channel (e.g., PDCCH).

A transmission periodicity of a reference signal (e.g., CSI-RS, TRS, SRS, etc.) transmitted for channel characteristic acquisition may vary depending on Doppler spread and Doppler shift appearing at a receiving end.

In the proposal 3, a channel measurement reference signal (or channel characteristic reference signal) transmitted for channel characteristic acquisition is hereinafter referred to as a 'first reference signal' for convenience of explanation.

The case where Doppler spread and Doppler shift are large may correspond to the case where the change of the channel over time is large.

If the change of the channel over time is large, the first reference signal is frequently transmitted in a small periodicity, and thus at a time when channel characteristics estimated based on the first reference signal are applied, an error between the estimated channel characteristics and actual channel characteristics can be reduced.

On the contrary, the case where Doppler spread and Doppler shift are small may correspond to the case where the change of the channel over time is small.

Thus, in such a case, the first reference signal may be transmitted in a large periodicity. In this instance, there is an advantage capable of reducing a reference signal overhead due to the first reference signal.

In summary, a transmission periodicity of the first reference signal may vary depending on how rapidly the channel characteristics change, and a change degree of the channel characteristics over time may vary depending on Doppler spread and Doppler shift.

That is, the transmission periodicity of the first reference signal may vary depending on Doppler spread and Doppler shift that the channel has.

A pattern of a reference signal (e.g., DM-RS) for data demodulation may be differently defined depending on Doppler spread and Doppler shift.

In the proposal 3, the reference signal (e.g., DM-RS) for data demodulation is hereinafter referred to as a 'second reference signal' for convenience of explanation.

When a pattern of the second reference signal is defined, the case where Doppler spread and Doppler shift are large may be defined as a pattern in which a time density is high.

On the contrary, the case where Doppler spread and Doppler shift are small may be defined as a pattern in which a time density is low.

The patterns P1 and P4 of FIG. 14, in which the frequency density is the same and the time density is different, correspond to an example of the pattern of the second reference signal.

That is, the pattern P1 may be a pattern of the second reference signal in which the time density is low, and the pattern P4 may be a pattern of the second reference signal in which the time density is high.

In summary, a periodicity of the first reference signal and a pattern of the second reference signal may be suitably configured depending on Doppler spread and Doppler shift.

That is, a periodicity of the first reference signal and a pattern of the second reference signal may properly correspond.

Specifically, a small transmission periodicity of the first reference signal may correspond to a pattern of the second reference signal in which a time density is high, and a large transmission periodicity of the first reference signal may correspond to a pattern of the second reference signal in which a time density is low.

In the case of a high speed scenario (HST) scenario that moves along a fixed path, the base station may predict a channel of the UE to some extent.

Thus, it may be preferable to apply this proposal 3 to the HST scenario.

The detailed technology content for supporting a method of the proposal 3 described in the present disclosure is described in more detail below.

The base station includes 'periodicityAndOffset' capable of representing the transmission periodicity of the first reference signal transmitted for channel characteristic acquisition, among parameters included in the higher layer parameter 'NZP-CSI-RS-Resource'.

The 'periodicityAndOffset' may represent different periodicities.

The base station may map the different periodicities of the 'periodicityAndOffset' and the pattern (DM-RS pattern) of the second reference signal and (pre)-configure the corresponding information to the UE via the higher layer signaling.

The base station may send the UE a QCL relationship between data upon the data transmission and a specific CSI-RS resource.

The 'data' may mean data of a data channel and/or data of a control channel, and the 'DM-RS pattern' may mean a DM-RS pattern for data demodulation of the data channel and/or a DM-RS pattern for data demodulation of the control channel.

The base station may indirectly indicate, to the UE, information related to a transmission beam applied to data transmission by sending the UE the QCL relationship.

The information related to the transmission beam may be simply referred to as 'transmission beam information'.

The transmission beam information may be previously shared between the base station and the UE.

The transmission beam information may include information on the transmission periodicity of the first reference signal transmitted through the corresponding beam.

The information on the transmission periodicity of the first reference signal may be simply referred to as 'transmission periodicity information'.

Through a correspondence relationship between the transmission periodicity of the first reference signal and the DM-RS pattern that is pre-configured between the base station and the UE, the base station may indirectly indicate, to the UE, information on the DM-RS pattern applied to data transmission.

Information related to the correspondence relationship between the transmission periodicity of the first reference signal and the DM-RS pattern may be simply referred to as 'third correspondence (mapping) information'.

In order for the base station to indicate the QCL relationship to the UE, a method described in the above 'Beam related mechanism' may be applied.

That is, the UE may be configured with parameter 'TCI-state' including information related to the QCL relationship.

The following Tables 18 and 19 show an example of the higher layer parameter configured by mapping the periodicities of the first reference signal and different DM-RS patterns.

TABLE 18

```
CSI-Resource PeriodicityAndOffsetAndDmrspattern : :=    CHOICE {
    slots4 SEQUENCE {
      offset INTEGER ( 0 .. 3),
      dmrs-pattern        Dmrs-patternId,
      ...
    },
    slots5     SEQUENCE {
      offset     INTEGER (0..4),
      dmrs-pattern        Dmrs-patternId,
      ...
    },
    ...
}
```

The above Table 18 shows an example of adding a parameter for the DM-RS pattern to a parameter configuring the transmission periodicity of the first reference signal.

It can be seen from the above Table 18 that parameter 'Dmrs-pattern' has been added.

TABLE 19

```
CSI-Resource PeriodicityAndDmrspattern : :=    SEQUENCE {
    slot4-dmrs Dmrs-patternId,
    slot5-dmrs Dmrs-patternId,
    slot8-dmrs Dmrs-patternId,
    slot10-dmrs         Dmrs-patternId,
    slot16-dmrs     Dmrs-patternId,
    slot20-dmrs     Dmrs-patternId,
    ...
}
```

The above Table 19 shows an example of defining a separate parameter for configuring a mapping relationship between the transmission periodicity of the first reference signal and the DM-RS pattern.

Since the example of Table 19 may not modify existing parameters, there is an advantage capable of operating the method of the proposal 3 while minimizing changes of an existing method.

Even if a certain base station needs to configure a short transmission periodicity of the first reference signal, the base station may randomly configure a long transmission periodicity in order to prevent an increase in a RS overhead.

In such a case, if a pattern of a second reference signal is defined considering low Doppler spread and low Doppler shift through the method described in the proposal 3, there may occur a deterioration in a data demodulation performance.

In order to prevent the performance deterioration, it is necessary to consider a separate signal exchange indicated so that the base station can selectively use the method described in the proposal 3.

Proposal 4: Differently Configuring Transmission Periodicity of Reference Signal Per Each Reference Signal Resource According to the proposal 4, a transmission periodicity of a reference signal (channel characteristic reference signal) that is transmitted to detect channel characteristics between a base station and a UE may be differently configured per each reference signal resource.

The channel characteristic reference signal may include CSI-RS, TRS, SRS, and the like.

As described in the proposal 3, a transmission periodicity of a reference signal transmitted for channel characteristic acquisition may vary depending on Doppler spread and Doppler shift appearing at a receiving end.

A reference signal transmitted for channel characteristic acquisition is hereinafter referred to as a 'first reference signal' for convenience of explanation.

When multiple first reference signals can be defined, a transmission periodicity of the first reference signal on a resource of each reference signal may be differently defined.

For example, when two first reference signals are transmitted on a resource A and a resource B, a transmission periodicity of the first reference signal on the resource A may be different from a transmission periodicity of the first reference signal on the resource B.

Herein, the reference signal resource may refer to a resource of a time domain and a frequency domain on which the reference signal is transmitted.

Further, a resource of each reference signal may be transmitted through a different beam.

For example, if there are two beams (beam A and beam B) and two resources (resource A and resource B), the beam A may transmit the resource A and the beam B may transmit the resource B.

FIG. 18 illustrates an example where two different first reference signals, to which different beams are applied, are transmitted at different periodicities.

In FIG. 18, a beam 2 (1810) that is a transmission beam of the base station is configured to support an area (area 1) with relatively low Doppler spread.

Further, a beam 3 (1820) that is a transmission beam of the base station is configured to support an area (area 2) with relatively high Doppler spread.

In FIG. 18, shown is a reference signal resource transmission timing of the first reference signals transmitted to the UE through the beam 2 (1810) and the beam 3 (1820).

A first reference signal that is transmitted applying the beam 2 is referred to as a 'first reference signal 1'.

Further, a first reference signal that is transmitted applying the beam 3 is referred to as a 'first reference signal 2'.

If a resource on which the 'first reference signal 1' is transmitted is referred to as a 'reference signal resource 1 (1811)', the 'first reference signal 1' is transmitted in a large periodicity $\tau_{beam2}$ since an area in which the 'first reference signal 1' is transmitted has low Doppler spread.

On the other hand, if a resource on which the 'first reference signal 2' is transmitted is referred to as a 'reference signal resource 2 (1812)', the 'first reference signal 2' is transmitted in a small periodicity $\tau_{beam3}$ since an area in which the 'first reference signal 2' is transmitted has high Doppler spread.

In the instance, the following condition is satisfied: $\tau_{beam2} \geq \tau_{beam3}$, and $\tau_{beam2}$ denotes a 'first transmission periodicity' and $\tau_{beam3}$ denotes a 'second transmission periodicity'.

In FIG. 18, when the UE moves along a fixed path, an area in which the signal transmitted through the beam 2 (1810) is detected more strongly is referred to as an 'area 1'.

The area 1 may refer to an area in which the signal transmitted through the beam 2 (1810) can be received at the UE with better quality than the signal transmitted through the beam 3 (1820).

Further, when the UE moves along the fixed path, an area in which the signal transmitted through the beam 3 (1820) is detected more strongly is referred to as an 'area 2'.

The area 2 may refer to an area in which the signal transmitted through the beam 3 (1820) can be received at the UE with better quality than the signal transmitted through the beam 2 (1810).

In an environment where channel characteristics rapidly change over time, the transmission periodicity of the reference signal is configured in a small periodicity, and thus at a time when channel characteristics estimated based on the first reference signal are applied, an error between the estimated channel characteristics and actual channel characteristics can be reduced.

However, if the first reference signal is transmitted in a small transmission periodicity, there may be a disadvantage to increase an RS overhead.

In particular, when a beam applied to data transmission is different from a beam applied to transmission of the first reference signal, the RS overhead may unnecessarily increase if the first reference signal transmitted through a beam that does not transmit data is configured to have a small transmission periodicity.

The area 1 (1830) illustrated in FIG. 18 shows a case in which the RS overhead unnecessarily increases.

Specifically, the beam 2 that is configured to support the area 1 (1830) based on the channel characteristics transmits data to the UE in the area 1 in 'the first transmission periodicity' with the large transmission periodicity.

Further, the beam 3 that is configured to support an area 2 (1840) based on the channel characteristics transmits 'the first reference signal 2' to the UE in the area 1 in 'the second transmission periodicity' with the small periodicity.

In this instance, 'the first reference signal 2' transmitted through the beam 3 in 'the second transmission periodicity' with the small periodicity may unnecessarily increase the RS overhead in the area 1.

As a method for reducing the unnecessary RS overhead, there may be a method in which a transmission periodicity of the reference signal is differently configured per resource area in which the reference signal is transmitted.

More specifically, a transmission periodicity of the first reference signal may be configured to temporarily change only in a specific area.

Through a method of the proposal 4, the 'second transmission periodicity' that is a transmission periodicity of the first reference signal of a beam not transmitting actual data is configured to be shorter than the 'first transmission periodicity' that is a transmission periodicity of a beam transmitting actual data or a beam with a high probability of transmitting data, and thus there is an effect of preventing an increase in the unnecessary RS overhead.

The detailed technology content for supporting the method of the proposal 4 described in the present disclosure is described in more detail below.

In the related art, a transmission periodicity of the first reference signal may be configured per each reference signal resource.

For example, a periodicity of each reference signal resource may be configured via 'periodicityAndOffset' within the higher layer parameter 'NZP-CSI-RS-Resource'.

Thus, the first reference signal transmitted to the UE may be transmitted per each reference signal resource with a periodicity configured via 'periodicityAndOffset'.

In this proposal method, a method is proposed, which configures a periodicity capable of having a higher priority than the periodicity configured per each reference signal resource.

More specifically, the base station may configure, to the UE, information capable of meaning a periodicity of the first reference signal related to a specific section. That is, the information representing the periodicity of the first reference signal in the specific section may be configured to the UE.

The information may be transmitted to the UE via higher layer signaling and/or downlink control information.

In this instance, when transmitting the information via the downlink control information, more dynamic configuration is possible than when transmitting the information via the higher layer signaling.

The following Table 20 shows an example of the higher layer parameter capable of configuring candidate values for a transmission periodicity of the first reference signal in a specific section on a moving path of the UE.

A specific value of the candidate values may be indicated to the UE via a specific downlink control information field.

TABLE 20

CSI-ResourcePeriodicity-duration-SetList  ::=  SEQUENCE {
   SIZE (1. . maxNrEx) OF CSI-ResourcePeriodicity-durationId,
   . . .
}
CSI-ResourcePeriodicity-duration  ::=  SEQUENCE {
   csi-resourceperiodicity-durationId  CSI-ResourcePeriodicity-durationId,
   periodicityAndOffsetMin CSI-ResourcePeriodicityAndOffset,
   duracion  ENUMERATED ( slot20, slot40, slot89, slot160 },
   . . .
}

Using the example of the above Table 20, candidates for a periodicity of the first reference signal in specific sections whose the number is 'maxNrEx', and in each of the 'maxNrEx' specific sections may be configured to the UE.

In the above Table 20, 'maxNrEx' is a parameter representing the number of specific sections when the moving path of the UE is able to be divided into specific sections.

For example, if 'maxNrEx' is 4, a path along which the UE moves may be divided into four sections according to channel characteristics.

Depending on the value of 'maxNrEx', each specific section shall be able to be identified.

For example, if 'maxNrEx' is 8, a downlink control information field of 3 bits may be required to identify the eight specific sections.

The base station may indicate, to the UE, a specific candidate value of candidate values of the specific section through the downlink control information field.

In Table 20, a specific 'periodicityAndOffsetMin' value indicated to the UE may be interpreted as a minimum transmission periodicity of the first reference signal during a specific section indicated through a 'duration' value.

The 'duration' value may have values of slot20, slot40, slot80 and slot160.

For example, if the 'duration' value of a specific section 1 is slot20, the specific section 1 is maintained for a duration of slot20 and then passes over to a next specific section.

If a periodicity value configured via 'periodicityAndOffset' within 'NZP-CSI-RS-Resource' is less than 'periodicityAndOffsetMin', a periodicity of the corresponding reference signal resource may be changed to a value 'periodicityAndOffsetMin' during the 'duration'.

Alternatively, a periodicity configured to each reference signal resource via existing 'periodicityAndOffset' may be maintained.

Alternatively, all the first reference signals transmitted during the corresponding 'duration' may be transmitted in a periodicity configured to 'periodicityAndOffsetMin'.

In the related art, the transmission periodicity of the first reference signal may be configured to instantaneously shorten using an aperiodic or semi-persistence method.

On the other hand, there is no a technology for further lengthening a transmission periodicity than the existing configured transmission periodicity.

Accordingly, it is currently impossible to reduce the RS overhead during a specific section by further lengthening the reference signal transmission periodicity than the existing configured transmission periodicity.

This proposal method has an effect of reducing the RS overhead by preventing an unnecessary increase in the RS overhead in the specific section.

FIG. 19 illustrates an example of an operation of a UE in the present disclosure described above.

More specifically, FIG. 19 illustrates an operation for a UE to receive a reference signal from a base station in a wireless communication system to which the present disclosure is applicable.

First, the UE receives, from the base station, configuration information in S1910.

The configuration information includes first mapping information related to a mapping relationship between a plurality of mapping patterns, to which dedicated demodulation reference signals are mapped on a resource, and a plurality of transmission beams through which the dedicated demodulation reference signals are transmitted.

The configuration information may further include second mapping information related to a mapping relationship between a number of antenna ports on which the dedicated demodulation reference signals are transmitted and the plurality of transmission beams through which the dedicated demodulation reference signals are transmitted.

The configuration information may further include third mapping information related to a mapping relationship between the plurality of mapping patterns, to which the dedicated demodulation reference signals are mapped on the resource and at least one different transmission periodicity of channel characteristic reference signals.

The number of antenna ports on which a first demodulation reference signal is transmitted is determined based on first transmission beam information according to the second mapping information.

Next, the UE receives, from the base station, a first demodulation reference signal related to a demodulation of downlink data in S1920.

Next, the UE receives, from the base station, the downlink data via a channel estimated based on the first demodulation reference signal in S1930.

The downlink data and the first demodulation reference signal are transmitted through at least one different transmission beam of the base station. A first mapping pattern of the first demodulation reference signal is determined based on the at least one different transmission beam according to the first mapping information.

The at least one different transmission beam may be determined based on channel characteristics of a channel on which the downlink data is transmitted.

The channel characteristics may be determined by Doppler spread and delay spread.

The first mapping pattern may be determined based on transmission periodicity information included in the first transmission beam information according to the third mapping information.

Additionally, the UE may receive, from the base station, downlink control information (DCI) including first transmission beam information related to the at least one different transmission beam.

This procedure may be performed before the step S1910, or performed between the S1910 and the step S1930, or performed after the step S1930.

The configuration information may be included in a system information message. The first transmission beam information may be included in a transmission configuration indication (TCI)-state that is a higher layer parameter included in the DCI.

A pattern identifier (ID) representing the first mapping pattern may be included in a TCI-state that is a higher layer parameter included in the DCI.

The first transmission beam information may be first quasi co-location (QCL) relationship information between an antenna port for a transmission of the downlink data and an antenna port for a transmission of a first specific reference signal. The second transmission beam information may be second QCL relationship information between an antenna port for a transmission of the DCI and an antenna port for a transmission of a second specific reference signal.

An indicator representing whether the first demodulation reference signal is transmitted via a plurality of antenna ports may be included in a TCI-state that is a higher layer parameter included in the DCI.

The first mapping pattern may be determined based on the first QCL relationship information. A second mapping pattern to which a second demodulation reference signal related to a demodulation of the DCI is mapped may be determined based on the second QCL relationship information.

The first mapping pattern and a second mapping pattern to which a second demodulation reference signal related to a demodulation of the DCI is mapped are determined based on the second QCL relationship information.

The first transmission beam information may further include transmission periodicity information related to a transmission periodicity of the channel characteristic reference signal.

Additionally, the UE may receive, from the base station, second transmission beam information related to a transmission beam for a transmission of the DCI.

This procedure may be performed before the step S1910, or performed between the S1910 and the step S1930, or performed after the step S1930.

Additionally, the UE may receive, from the base station, a channel characteristic reference signal for detecting characteristics of a channel.

This procedure may be performed before the step S1910, or performed between the S1910 and the step S1930, or performed after the step S1930.

A pattern identifier (ID) representing the first mapping pattern may be included in a parameter for configuring the at least one different transmission periodicity.

The transmission periodicity may be differently configured per resource on which the channel characteristic reference signal is transmitted.

With reference to the UE's operation method of FIG. 19, the following is described that an operation for a UE to receive a reference signal from a base station in a wireless communication system described in the present disclosure is implemented at the UE.

In the wireless communication system, the UE receiving a reference signal from the base station includes a transmitter configured to transmit a radio signal, a receiver configured to receive the radio signal, and a processor functionally connected to the transmitter and the receiver.

The processor controls the receiver so that the UE receives, from the base station, configuration information.

The configuration information includes first mapping information related to a mapping relationship between a plurality of mapping patterns, to which dedicated demodulation reference signals are mapped on a resource, and a plurality of transmission beams through which the dedicated demodulation reference signals are transmitted.

Next, the processor controls the receiver so that the UE receives, from the base station, a first demodulation reference signal related to a demodulation of downlink data.

Next, the processor controls the receiver so that the UE receives, from the base station, the downlink data via a channel estimated based on the first demodulation reference signal.

The downlink data and the first demodulation reference signal are transmitted through at least one different transmission beam of the base station. A first mapping pattern of the first demodulation reference signal is determined based on the at least one different transmission beam according to the first mapping information.

FIG. 20 illustrates an example of an operation of a base station in the present disclosure described above.

More specifically, FIG. 20 illustrates an operation for a base station to transmit a reference signal to a UE in a wireless communication system to which the present disclosure is applicable.

First, the base station transmits, to the UE, configuration information in S2010.

The configuration information includes first mapping information related to a mapping relationship between a plurality of mapping patterns, to which dedicated demodulation reference signals are mapped on a resource, and a plurality of transmission beams through which the dedicated demodulation reference signals are transmitted.

The configuration information may further include second mapping information related to a mapping relationship between a number of antenna ports on which the dedicated demodulation reference signals are transmitted and the plurality of transmission beams through which the dedicated demodulation reference signals are transmitted.

The configuration information may further include third mapping information related to a mapping relationship between the plurality of mapping patterns, to which the dedicated demodulation reference signals are mapped on the resource and at least one different transmission periodicity of channel characteristic reference signals.

The number of antenna ports on which a first demodulation reference signal is transmitted is determined based on first transmission beam information according to the second mapping information.

Next, the base station transmits, to the UE, a first demodulation reference signal related to a demodulation of downlink data in S2020.

Next, the base station transmits, to the UE, the downlink data via a channel estimated based on the first demodulation reference signal in S2030.

The downlink data and the first demodulation reference signal are transmitted through at least one different transmission beam of the base station. A first mapping pattern of the first demodulation reference signal is determined based on the at least one different transmission beam according to the first mapping information.

The at least one different transmission beam may be determined based on channel characteristics of a channel on which the downlink data is transmitted.

The channel characteristics may be determined by Doppler spread and delay spread.

The first mapping pattern may be determined based on transmission periodicity information included in the first transmission beam information according to the third mapping information.

Additionally, the base station may transmit, to the UE, downlink control information (DCI) including first transmission beam information related to the at least one different transmission beam.

This procedure may be performed before the step S2010, or performed between the S2010 and the step S2030, or performed after the step S2030.

The configuration information may be included in a system information message. The first transmission beam information may be included in a transmission configuration indication (TCI)-state that is a higher layer parameter included in the DCI.

A pattern identifier (ID) representing the first mapping pattern may be included in a TCI-state that is a higher layer parameter included in the DCI.

The first transmission beam information may be first quasi co-location (QCL) relationship information between an antenna port for a transmission of the downlink data and an antenna port for a transmission of a first specific reference signal. The second transmission beam information may be second QCL relationship information between an antenna port for a transmission of the DCI and an antenna port for a transmission of a second specific reference signal.

An indicator representing whether the first demodulation reference signal is transmitted via a plurality of antenna ports may be included in a TCI-state that is a higher layer parameter included in the DCI.

The first mapping pattern may be determined based on the first QCL relationship information. A second mapping pattern to which a second demodulation reference signal related to a demodulation of the DCI is mapped may be determined based on the second QCL relationship information.

The first mapping pattern and a second mapping pattern to which a second demodulation reference signal related to a demodulation of the DCI is mapped are determined based on the second QCL relationship information.

The first transmission beam information may further include transmission periodicity information related to a transmission periodicity of the channel characteristic reference signal.

Additionally, the base station may transmit, to the UE, second transmission beam information related to a transmission beam for a transmission of the DCI.

This procedure may be performed before the step S2010, or performed between the S2010 and the step S2030, or performed after the step S2030.

Additionally, the base station may transmit, to the UE, a channel characteristic reference signal for detecting characteristics of a channel.

This procedure may be performed before the step S2010, or performed between the S2010 and the step S2030, or performed after the step S2030.

A pattern identifier (ID) representing the first mapping pattern may be included in a parameter for configuring the at least one different transmission periodicity.

The transmission periodicity may be differently configured per resource on which the channel characteristic reference signal is transmitted.

With reference to the operation method of the base station of FIG. 20, the following is described that an operation for a base station to transmit a reference signal to a UE in a wireless communication system described in the present disclosure is implemented at the base station.

In the wireless communication system, the base station transmitting a reference signal to the UE includes a transmitter configured to transmit a radio signal, a receiver configured to receive the radio signal, and a processor functionally connected to the transmitter and the receiver.

The processor controls the transmitter so that the base station transmits, to the UE, configuration information.

The configuration information includes first mapping information related to a mapping relationship between a plurality of mapping patterns, to which dedicated demodulation reference signals are mapped on a resource, and a plurality of transmission beams through which the dedicated demodulation reference signals are transmitted.

Next, the processor controls the transmitter so that the base station transmits, to the UE, a first demodulation reference signal related to a demodulation of downlink data.

Next, the processor controls the transmitter so that the base station transmits, to the UE, the downlink data via a channel estimated based on the first demodulation reference signal.

The downlink data and the first demodulation reference signal are transmitted through at least one different transmission beam of the base station. A first mapping pattern of the first demodulation reference signal is determined based on the at least one different transmission beam according to the first mapping information.

Overview of Device to which the Present Disclosure is Applicable

FIG. 21 illustrates a block configuration diagram of a wireless communication device to which methods described in the present disclosure are applicable.

Referring to FIG. 21, a wireless communication system includes a base station 2110 and multiple UEs 2120 located in an area of the base station.

Each of the base station 2110 and the UE 2120 may be represented as a wireless device.

The base station 2110 includes a processor 2111, a memory 2112, and a radio frequency (RF) module 2113. The processor 2111 implements functions, processes, and/or methods described in FIGS. 1 to 20. Layers of radio interface protocol may be implemented by the processor 2111. The memory 2112 is connected to the processor 2111 and stores various types of information for driving the processor 2111. The RF module 2113 is connected to the processor 2111 and transmits and/or receives radio signals.

The UE 2120 includes a processor 2121, a memory 2122, and a RF module 2123.

The processor 2121 implements functions, processes, and/or methods described in FIGS. 1 to 19. Layers of radio interface protocol may be implemented by the processor 2121. The memory 2122 is connected to the processor 2121 and stores various types of information for driving the processor 2121. The RF module 2123 is connected to the processor 2121 and transmits and/or receives radio signals.

The memories 2112 and 2122 may be inside or outside the processors 2111 and 2121 and may be connected to the processors 2111 and 2121 through various well-known means.

Further, the base station 2110 and/or the UE 2120 may have a single antenna or multiple antennas.

Antennas 2114 and 2124 function to transmit and receive a radio signal.

FIG. 22 illustrates another example of a block configuration diagram of a wireless communication device to which methods described in the present disclosure are applicable.

Referring to FIG. 22, a wireless communication system includes a base station 2210 and multiple UEs 2220 located in an area of the base station. The base station 2210 may be represented by a transmitter, and the UE 2220 may be represented by a receiver, or vice versa. The base station 2210 and the UE 2220 respectively include processors 2211 and 2221, memories 2214 and 2224, one or more Tx/Rx RF modules 2215 and 2225, Tx processors 2212 and 2222, Rx processors 2213 and 2223, and antennas 2216 and 2226. The processors implement functions, processes, and/or methods described above.

More specifically, in DL (communication from the base station to the UE), an upper layer packet from a core network is provided to the processor 2211. The processor implements functionality of the L2 layer. In the DL, the processor provides multiplexing between a logical channel and a transport channel and radio resource allocation to the UE 2220 and is also responsible for signaling to the UE 2220. The transmit (Tx) processor 2212 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 2216 via a separate Tx/Rx module (or transceiver 2215). Each Tx/Rx module may modulate an RF carrier with a respective spatial stream for transmission. At the UE, each Tx/Rx module (or transceiver 2225) receives a signal through the respective antenna 2226 of each Tx/Rx module. Each Tx/Rx module recovers information modulated onto an RF carrier and provides the information to the receive (Rx) processor 2223. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that were originally transmitted by the base station on the physical channel. The corresponding data and control signals are provided to the processor 2221.

UL (communication from the UE to the base station) is processed at the base station 2210 in a manner similar to the description associated with a receiver function at the UE 2220. Each Tx/Rx module 2225 receives a signal through the respective antenna 2226. Each Tx/Rx module provides an RF carrier and information to the Rx processor 2223. The processor 2221 may be associated with the memory 2224 that stores a program code and data. The memory may be referred to as a computer readable medium.

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

In the present disclosure, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), a foldable device, and the like. For example, the HMD is a display device worn on the head and may be used to implement VR or AR.

The methods described in the present disclosure can be fusionly applied to future technologies.

First, artificial intelligence means the field in which artificial intelligence or methodology capable of producing the artificial intelligence is researched. Machine learning means the field in which various problems handled in the artificial intelligence field are defined and methodology for solving the problems is researched. Machine learning is also defined as an algorithm for improving performance of a task through continuous experiences for the task.

An artificial neural network (ANN) is a model used in machine learning, and may refer to the entire model with a problem-solving ability which is configured with artificial neurons (nodes) forming a network through a combination of synapses. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter refers to a parameter that shall be configured before learning in a machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Next, a robot may mean a machine that automatically processes a given task or operates based on an autonomously owned ability. Particularly, a robot having a function for recognizing and autonomously determining an environment and performing an operation may be called an intelligent robot.

The robot may be classified for industry, medical treatment, home, and military based on its use purpose or field.

The robot includes a driver including an actuator or motor, and can perform various physical operations, such as moving a robot joint. Furthermore, a movable robot includes a wheel, a brake, a propeller, etc. in the driver, and may run on the ground or fly in the air through the driver.

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed, such as adaptive cruise control, a technology for automatically driving along a fixed path, a technology for automatically setting a path when a destination is set and driving, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered as a robot having a self-driving function.

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object together. However, there is a difference in that a virtual object is used to supplement a real object in the AR technology, and on the other hand, a virtual object and a real object are used as the same character in the MR technology.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 23 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 23, the AI device 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from the external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model configured with an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with a learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform operation determined by controlling the components of the AI device 100.

To this end, the processor 180 can request, search, receive, or utilize data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be configured as an artificial neural network of which at least a portion is trained according to a machine learning algorithm. Furthermore, at least one of the STT engine or the NLP engine may have been trained by the learning processor 130, may have been trained by the learning processor 240 of the AI server 200, or may have been trained by distributed processing thereof.

The processor 180 may collect history information including the feedback, etc. of the user for the operation contents or an operation of the AI device 100, and may store the history information in the memory 170 or the learning processor 130 or may transmit the history information to an external device, such as the AI server 200. The collected history information may be used to update a learning model.

The processor 18 may control at least some of the components of the AI device 100 in order to run an application program stored in the memory 170. Moreover, the processor 180 may combine and operate two or more of the components included in the AI device 100 in order to run the application program.

FIG. 24 illustrates an AI server 200 according to an embodiment of the present disclosure.

Referring to FIG. 24, the AI server 200 may refer to a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least a part of AI processing.

The AI server 200 may include a communication unit 210, a memory 230, a learning processor 240, and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network, or may be mounted on an external device such as the AI device 100 and used.

The learning model may be implemented as hardware, software or a combination of hardware and software. If a part or all of the learning model is implemented as software, one or more instructions configuring the learning model may be stored in the memory 230.

The processor 260 may deduce a result value of new input data using the learning model and generate a response or a control command based on the deduced result value.

FIG. 25 illustrates an AI system 1 according to an embodiment of the present disclosure.

Referring to FIG. 25, in the AI system 1, at least one of the AI server 200, a robot 100a, a self-driving vehicle 100b, an XR device 100c, a smartphone 100d, or home appliances 100e is connected to a cloud network 10. The robot 100a, the self-driving vehicle 100b, the XR device 100c, the smartphone 100d or the home appliances 100e to which the AI technology is applied may be called AI devices 100a to 100e.

The cloud network 10 may constitute part of cloud computing infra or may mean a network present within cloud computing infra. The cloud network 10 may be configured using the 3G network, the 4G or long term evolution (LTE) network, or the 5G network.

That is, the devices 100a to 100e and 200 constituting the AI system 1 may be interconnected over the cloud network 10. In particular, the devices 100a to 100e and 200 may communicate with each other through a base station, or may directly communicate with each other without the intervention of the base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that are AI devices constituting the AI system 1, over the cloud network 10, and may help at least part of the AI processing of the connected AI devices 100a to 100e.

The AI server 200 can train an artificial neural network based on a machine learning algorithm in place of the AI devices 100a to 100e, and can directly store a learning model or transmit the learning model to the AI devices 100a to 100e.

The AI server 200 can receive input data from the AI devices 100a to 100e, deduce a result value of the received input data using the learning model, generate a response or control command based on the deduced result value, and transmit the response or control command to the AI devices 100a to 100e.

Alternatively, the AI devices 100a to 100e can directly deduce a result value of input data using a learning model, and can generate a response or a control command based on the deduced result value.

Various implementations of the AI devices 100a to 100e to which the above-described technologies are applied are described below. Herein, the AI devices 100a to 100e illustrated in FIG. 25 may be considered as detailed implementations of the AI device 100 illustrated in FIG. 23.

The AI technology is applied to the robot 100a, and the robot 100a may be implemented as a guidance robot, a transport robot, a cleaning robot, a wearable robot, an entertainment robot, a pet robot, an unmanned aerial robot, etc.

The above-described technologies illustrated in FIGS. 23 to 25 can be applied fusionly.

The robot 100a may include a robot control module for controlling an operation. The robot control module may mean a software module or a chip in which a software module is implemented using hardware.

The robot 100a may obtain state information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor of LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Herein, the learning model may have been directly trained in the robot 100a or may have been trained in an external device, such as the AI server 200.

The robot 100a may directly generate results using the learning model and perform an operation, but may perform an operation by transmitting sensor information to an external device, such as the AI server 200, and receiving results generated in response to this.

The robot 100a may determine the moving path and the running plan using at least one of map data, object information detected from sensor information, or object information obtained from the external device. The robot 100*a* may run along the determined moving path and running plan by controlling the driver.

The map data may include object identification information for various objects disposed in the space in which the robot 100*a* moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100*a* may perform an operation or run by controlling the driver based on a user's control/interaction. In this case, the robot 100*a* may obtain intention information of an interaction according to a user's behavior or voice utterance, may determine a response based on the obtained intention information, and may perform an operation.

The AI technology is applied to the self-driving vehicle 100*b*, and the self-driving vehicle 100*b* may be implemented as a mobile robot, a vehicle, an unmanned aerial vehicle, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as the component of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, detect (recognize) a surrounding environment and object, generate map data, determine a moving path and a running plan, or determine an operation, using sensor information obtained from various types of sensors.

In order to determine the moving path and the running plan, the self-driving vehicle 100*b* may use sensor information obtained from at least one sensor among LIDAR, a radar and a camera, in the same manner as the robot 100*a*.

Particularly, the self-driving vehicle 100*b* may recognize an environment or an object in an area in which a sight is blocked or an area of a predetermined distance or more by receiving sensor information from external devices, or may receive information that is directly recognized from the external devices.

The self-driving vehicle 100*b* may perform the above operations using a learning model consisting of at least one artificial neural network. For example, the self-driving vehicle 100*b* may recognize a surrounding environment and object using a learning model and determine a running path using the recognized surrounding environment information or object information. Herein, the learning model may have been directly trained in the self-driving vehicle 100*b* or may have been trained in an external device, such as the AI server 200.

In this instance, the self-driving vehicle 100*b* may directly generate results using the learning model to perform an operation, but may perform an operation by transmitting sensor information to an external device, such as the AI server 200, and receiving results generated in response to this.

The self-driving vehicle 100*b* may determine a moving path and a running plan using at least one of map data, object information detected from sensor information, or object information obtained from an external device. The self-driving vehicle 100*b* may run based on the determined moving path and running plan by controlling the driver.

The map data may include object identification information for various objects disposed in the space (e.g., road) on which the self-driving vehicle 100*b* runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 100*b* may perform an operation or run by controlling the driver based on a user's control/interaction. In this case, the self-driving vehicle 100*b* may obtain intention information of an interaction according to a user' behavior or voice speaking, may determine a response based on the obtained intention information, and may perform an operation.

The AI technology is applied to the XR device 100*c*, and the XR device 100*c* may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100*c* may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 100*c* may output an XR object including additional information for a recognized object by making the XR object correspond to the corresponding recognized object.

The XR device 100*c* may perform the above operations using a learning model consisting of at least one artificial neural network. For example, the XR device 100*c* may recognize a real object in 3D point cloud data or image data using a learning model, and may provide information corresponding to the recognized real object. In this case, the learning model may have been directly trained in the XR device 100*c* or may have been trained in an external device such as the AI server 200.

In this instance, the XR device 100*c* may directly generate results using a learning model and perform an operation, but may perform an operation by transmitting sensor information to an external device such as the AI server 200 and receiving results generated in response to this.

The AI technology and the self-driving technology are applied to the robot 100*a*, and the robot 100*a* may be implemented as a guidance robot, a transport robot, a cleaning robot, a wearable robot, an entertainment robot, a pet robot, an unmanned aerial robot, etc.

The robot 100*a* to which the AI technology and the self-driving technology are applied may mean a robot itself having a self-driving function, or may mean the robot 100*a* interacting with the self-driving vehicle 100*b*.

The robot 100*a* with the self-driving function may collectively refer to devices that move by itself along a given path without control of a user or determine by itself a moving path and move.

The robot 100*a* with the self-driving function and the self-driving vehicle 100*b* may use a common sensing method to determine one or more of a moving path or a running plan. For example, the robot 100*a* with the self-driving function and the self-driving vehicle 100*b* may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of a driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information including signal information, etc., as in a smart traffic light, and may automatically connect an electric charger to a filling inlet through an interaction with the self-driving vehicle 100b as in the automatic electric charger of an electric vehicle.

The AI technology and the XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology is applied may mean a robot that is a target of control/interaction within an XR image. In this case, the robot 100a is different from the XR device 100c, and they may operate in conjunction with each other.

If the robot 100a that is a target of control/interaction within the XR image obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a remotely operating in conjunction through an external device such as the XR device 100c, may adjust a self-driving path of the robot 100a through an interaction, may control an operation or driving, or may identify information of a surrounding object.

The AI technology and the XR technology are applied to the self-driving vehicle 100b, and the self-driving vehicle 100b may be implemented as a mobile robot, a vehicle, an unmanned aerial vehicle, etc.

The self-driving vehicle 100b to which the XR technology is applied may mean a self-driving vehicle provided with a means for providing an XR image or a self-driving vehicle that is a target of control/interaction within the XR image. Particularly, the self-driving vehicle 100b that is the target of control/interaction within the XR image is different from the XR device 100c, and they may operate in conjunction with each other.

The self-driving vehicle 100b provided with the means for providing the XR image may obtain sensor information from sensors including a camera, and may output the XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 100b, at least a part of the XR object may be output to overlap with an object within a screen. For example, the self-driving vehicle 100b may output XR objects corresponding to objects, such as a carriageway, another vehicle, a traffic light, a signpost, a two-wheeled vehicle, a pedestrian, and a building.

If the self-driving vehicle 100b that is a target of control/interaction within an XR image obtains sensor information from sensors including a camera, the self-driving vehicle 100b or the XR device 100c may create an XR image based on the sensor information, and the XR device 100c may output the created XR image. Furthermore, the self-driving vehicle 100b may operate based on a control signal received through an external device, such as the XR device 100c, or a user's interaction.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment.

It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure.

Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

The present disclosure relates to a wireless communication system, and more particularly to a method for adaptively configuring a reference signal pattern in a high speed train scenario and a device supporting the same.

The invention claimed is:

1. A method for a user equipment (UE) to receive a reference signal from a base station in a wireless communication system, the method comprising:
  receiving, from the base station, one or more synchronization signals;
  receiving, from the base station, system information;
  receiving, from the base station, at least one reference signal for downlink measurement;
  transmitting, to the base station, feedback information for the downlink measurement;
  receiving, from the base station, configuration information,
  wherein the configuration information includes first mapping information related to a mapping relationship between a plurality of demodulation reference signal (DM-RS) mapping patterns, to which dedicated (DM-RSs) are mapped on a resource, and a plurality of transmission beams through which the dedicated DM-RSs are transmitted,
  wherein the configuration information further includes third mapping information related to a mapping relationship between the plurality of DM-RS mapping patterns and a plurality of transmission periodicities of a channel state information reference signal (CSI-RS);
  receiving, from the base station, CSI-RSs with a specific transmission periodicity from among the plurality of transmission periodicities;
  receiving, from the base station, downlink control information (DCI) including first transmission beam information related to a first transmission beam among the plurality of transmission beams;
  identifying a first DM-RS mapping pattern mapped to the first transmission beam and the specific transmission periodicity based on the first mapping information and the third mapping information;
  estimating a channel based on a first dedicated DM-RS related to a demodulation of downlink data, wherein the first dedicated DM-RS is received through the first transmission beam using the first DM-RS mapping pattern; and
  receiving, from the base station, the downlink data via the estimated channel through the first transmission beam,
  wherein a different DM-RS mapping pattern among the plurality of DM-RS mapping patterns corresponds to a different transmission beam among the plurality of transmission beams.

2. The method of claim 1, wherein the first transmission beam is determined based on channel characteristics of a channel on which the downlink data is transmitted.

3. The method of claim 2, wherein the channel characteristics are determined by Doppler spread and delay spread.

4. The method of claim 1, wherein the configuration information is included in a system information message,
  wherein the first transmission beam information is included in a transmission configuration indication (TCI)-state that is a higher layer parameter included in the DCI.

5. The method of claim 1, wherein a pattern identifier (ID) representing the first DM-RS mapping pattern is included in a transmission configuration indication (TCI)-state that is a higher layer parameter included in the DCI.

6. The method of claim 1, further comprising:
  receiving, from the base station, second transmission beam information related to a second transmission beam for a transmission of the DCI.

7. The method of claim 6, wherein the first transmission beam information is first quasi co-location (QCL) relationship information between an antenna port for a transmission of the downlink data and an antenna port for a transmission of a first specific reference signal,
  wherein the second transmission beam information is second QCL relationship information between an antenna port for a transmission of the DCI and an antenna port for a transmission of a second specific reference signal.

8. The method of claim 7, wherein the first DM-RS mapping pattern is determined based on the first QCL relationship information,
  wherein a second DM-RS mapping pattern to which a second dedicated DM-RS related to a demodulation of the DCI is mapped is determined based on the second QCL relationship information.

9. The method of claim 7, wherein the first DM-RS mapping pattern and a second DM-RS mapping pattern to which a second dedicated DM-RS related to a demodulation of the DCI is mapped are determined based on the second QCL relationship information.

10. The method of claim 1, wherein the configuration information further includes second mapping information related to a mapping relationship between a number of antenna ports on which the dedicated DM-RSs are transmitted and the plurality of transmission beams through which the dedicated DM-RSs are transmitted,
  wherein a number of antenna ports on which the first dedicated DM-RS is transmitted is determined based on the first transmission beam information according to the second mapping information.

11. The method of claim 10, wherein the configuration information is included in a system information message,
  wherein the first transmission beam information is included in a transmission configuration indication (TCI)-state that is a higher layer parameter included in the DCI.

12. The method of claim 10, wherein an indicator representing whether the first dedicated DM-RS is transmitted via a plurality of antenna ports is included in a transmission configuration indication (TCI)-state that is a higher layer parameter included in the DCI.

13. The method of claim 1, wherein the configuration information is included in a system information message, wherein the first transmission beam information is included in a transmission configuration indication (TCI)-state that is a higher layer parameter included in the DCI.

14. The method of claim 1, wherein a pattern identifier (ID) representing the first DM-RS mapping pattern is included in a parameter for configuring the plurality of transmission periodicities.

15. The method of claim 1, wherein each of the plurality of transmission periodicities is differently configured per CSI-RS resource on which the CSI-RS is transmitted.

16. A method for a base station to transmit a reference signal to a user equipment (UE) in a wireless communication system, the method comprising:
  transmitting, to the UE, one or more synchronization signals;
  transmitting, to the UE, system information;
  transmitting, to the UE, at least one reference signal for downlink measurement;
  receiving, from the UE, feedback information for the downlink measurement;
  transmitting, to the UE, configuration information,
  wherein the configuration information includes first mapping information related to a mapping relationship between a plurality of demodulation reference signal (DM-RS) mapping patterns, to which dedicated DM-RSs are mapped on a resource, and a plurality of transmission beams through which the dedicated DM-RSs are transmitted,
  wherein the configuration information further includes third mapping information related to a mapping relationship between the plurality of DM-RS mapping patterns and a plurality of transmission periodicities of a channel state information reference signal (CSI-RS);
  transmitting, to the UE, CSI-RSs with a specific transmission periodicity from among the plurality of transmission periodicities;
  transmitting, to the UE, downlink control information (DCI) including first transmission beam information related to a first transmission beam among the plurality of transmission beams;
  transmitting, to the UE, a first dedicated DM-RS related to a demodulation of downlink data through the first transmission beam using a first DM-RS mapping pattern, wherein the first DM-RS mapping pattern is mapped to the first transmission beam and the specific transmission periodicity based on the first mapping information and the third mapping information; and
  transmitting, to the UE, the downlink data via a channel estimated based on the first DM-RS through the first transmission beam,
  wherein a different DM-RS mapping pattern among the plurality of DM-RS mapping patterns corresponds to a different transmission beam among the plurality of transmission beams.

17. A user equipment (UE) receiving a reference signal from a base station in a wireless communication system, the UE comprising:
  a transmitter configured to transmit a radio signal;
  a receiver configured to receive the radio signal; and
  a processor functionally connected to the transmitter and the receiver,
  wherein the processor is configured to:
  receive, from the base station, one or more synchronization signals;
  receive, from the base station, system information;
  receive, from the base station, at least one reference signal for downlink measurement;
  transmit, to the base station, feedback information for the downlink measurement;
  receive, from the base station, configuration information,
  wherein the configuration information includes first mapping information related to a mapping relationship between a plurality of demodulation reference signal (DM-RS) mapping patterns, to which dedicated DM-RSs are mapped on a resource, and a plurality of transmission beams through which the dedicated DM-RSs are transmitted,
  wherein the configuration information further includes third mapping information related to a mapping relationship between the plurality of DM-RS mapping patterns and a plurality of transmission periodicities of a channel state information reference signal (CSI-RS);
  receive, from the base station, CSI-RSs with a specific transmission periodicity from among the plurality of transmission periodicities;
  receive, from the base station, downlink control information (DCI) including first transmission beam information related to a first transmission beam among the plurality of transmission beams;
  identify a first DM-RS mapping pattern mapped to the first transmission beam and the specific transmission periodicity based on the first mapping information and the third mapping information;
  estimate a channel based on a first dedicated DM-RS related to a demodulation of downlink data, wherein the first dedicated DM-RS is received through the first transmission beam using the first DM-RS mapping pattern; and
  receive, from the base station, the downlink data via the estimated channel through the first transmission beam,
  wherein a different DM-RS mapping pattern among the plurality of DM-RS mapping patterns corresponds to a different transmission beam among the plurality of transmission beams.

* * * * *